(12) United States Patent
Eisenberger

(10) Patent No.: US 8,163,066 B2
(45) Date of Patent: Apr. 24, 2012

(54) CARBON DIOXIDE CAPTURE/REGENERATION STRUCTURES AND TECHNIQUES

(76) Inventor: Peter Eisenberger, Princeton, NJ (US)

( * ) Notice: Subject to any disclaimer, the term of this patent is extended or adjusted under 35 U.S.C. 154(b) by 0 days.

(21) Appl. No.: 12/725,299

(22) Filed: Mar. 16, 2010

(65) Prior Publication Data
US 2011/0041688 A1 Feb. 24, 2011

Related U.S. Application Data

(63) Continuation-in-part of application No. 12/124,864, filed on May 21, 2008, now abandoned, which is a continuation-in-part of application No. 11/825,468, filed on Jul. 6, 2007, now abandoned, and a continuation-in-part of application No. 11/805,477, filed on May 22, 2007, now abandoned, and a continuation-in-part of application No. 11/805,271, filed on May 21, 2007, now abandoned.

(60) Provisional application No. 61/210,296, filed on Mar. 17, 2009.

(51) Int. Cl.
*B01D 53/06* (2006.01)
(52) U.S. Cl. ............... 95/107; 95/139; 96/126; 96/146
(58) Field of Classification Search .............. 95/107, 95/139; 96/126, 146
See application file for complete search history.

(56) References Cited

U.S. PATENT DOCUMENTS

| | | | |
|---|---|---|---|
| 4,197,421 A | 4/1980 | Steinberg | |
| 4,243,613 A | 1/1981 | Brockhaus et al. | |
| 4,285,918 A | 8/1981 | Gustafson | |
| 4,455,153 A | 6/1984 | Jakahi | |
| 4,472,178 A | 9/1984 | Kumar | |
| 4,579,723 A | 4/1986 | Weltmer et al. | |
| 4,711,645 A | 12/1987 | Kumar | |
| 4,762,528 A | 8/1988 | Reichl | |
| 4,810,266 A | 3/1989 | Zinnen et al. | |
| 4,822,383 A | 4/1989 | Brose et al. | |
| 5,061,455 A | 10/1991 | Brose et al. | |
| 5,087,597 A | 2/1992 | Leal et al. | |
| 5,364,887 A | 11/1994 | Konig et al. | |
| 5,376,614 A | 12/1994 | Birbara et al. | |
| 5,424,051 A | 6/1995 | Nagji et al. | |

(Continued)

FOREIGN PATENT DOCUMENTS

EP 20021180511 A2 2/2002

(Continued)

OTHER PUBLICATIONS

Stolaroff, Joshuah et al. "A Pilot-scal prototype contractor for CO2 capture from ambient air; cost and energy requirements." www.ucalgary.ca/~keith/papers/84.Stolaroff.Air....

(Continued)

*Primary Examiner* — Robert J Hill, Jr.
*Assistant Examiner* — Christopher P Jones
(74) *Attorney, Agent, or Firm* — Paul J. Sutton; Barry G. Magidoff

(57) ABSTRACT

New and useful system and method concepts are provided, for removing carbon dioxide from a flow of carbon dioxide laden air. More specifically, a sorbent structure is used in new and useful structures and techniques to bind carbon dioxide in a carbon dioxide laden air stream, and process heat is used to separate carbon dioxide from the sorbent structure and regenerate the sorbent structure.

8 Claims, 17 Drawing Sheets

U.S. PATENT DOCUMENTS

| | | | |
|---|---|---|---|
| 5,443,804 A | 8/1995 | Parker et al. | |
| 5,492,683 A | 2/1996 | Birbara et al. | |
| 5,520,894 A | 5/1996 | Heesink et al. | |
| 5,593,475 A | 1/1997 | Minh | |
| 5,653,785 A | 8/1997 | Horio et al. | |
| 5,876,488 A | 3/1999 | Birbara et al. | |
| 5,906,806 A | 5/1999 | Clark | |
| 5,928,806 A | 7/1999 | Olah et al. | |
| 5,958,353 A | 9/1999 | Eyal | |
| 6,048,509 A | 4/2000 | Kawai et al. | |
| 6,090,186 A | 7/2000 | Spencer | |
| 6,106,595 A | 8/2000 | Spencer | |
| 6,117,404 A | 9/2000 | Mimura et al. | |
| 6,174,506 B1 | 1/2001 | Chakravarti et al. | |
| 6,364,938 B1 | 4/2002 | Birbara et al. | |
| 6,387,337 B1 * | 5/2002 | Pennline et al. | 423/220 |
| 6,540,936 B1 | 4/2003 | Takagi et al. | |
| 6,547,854 B1 | 4/2003 | Gray et al. | |
| 6,797,039 B2 | 9/2004 | Spencer | |
| 6,890,497 B2 | 5/2005 | Rau et al. | |
| 6,908,497 B1 | 6/2005 | Sirwardane | |
| 6,929,680 B2 | 8/2005 | Krushnevych et al. | |
| 7,128,777 B2 | 10/2006 | Spencer | |
| 7,132,090 B2 | 11/2006 | Dziedzic et al. | |
| 7,141,859 B2 | 11/2006 | DeBoer et al. | |
| 7,795,175 B2 | 9/2010 | Olah et al. | |
| 2001/0047995 A1 | 12/2001 | Pozgainer et al. | |
| 2002/0000260 A1 | 1/2002 | Palvoelgyi et al. | |
| 2002/0187372 A1 | 12/2002 | Hall et al. | |
| 2003/0006274 A1 | 1/2003 | Lackner et al. | |
| 2003/0061906 A1 | 4/2003 | Knunz et al. | |
| 2003/0075012 A1 | 4/2003 | Knunz et al. | |
| 2004/0142888 A1 | 7/2004 | Manne et al. | |
| 2004/0213705 A1 | 10/2004 | Blencoe | |
| 2004/0253159 A1 | 12/2004 | Hakka et al. | |
| 2005/0180910 A1 | 8/2005 | Park et al. | |
| 2006/0051274 A1 | 3/2006 | Wright et al. | |
| 2006/0084063 A1 | 4/2006 | Costa et al. | |
| 2006/0101945 A1 | 5/2006 | Lackner et al. | |
| 2006/0105419 A1 | 5/2006 | Blankenberg et al. | |
| 2006/0168940 A1 | 8/2006 | Offenhuber et al. | |
| 2006/0178989 A1 | 8/2006 | Lackner et al. | |
| 2006/0186562 A1 | 8/2006 | Wright et al. | |
| 2006/0188423 A1 | 8/2006 | Cadours et al. | |
| 2006/0289003 A1 | 12/2006 | Lackner et al. | |
| 2007/0033767 A1 | 2/2007 | Dodson et al. | |
| 2007/0068525 A1 | 3/2007 | Offenhuber et al. | |
| 2007/0086909 A1 | 4/2007 | Abenthung et al. | |
| 2007/0187247 A1 | 8/2007 | Lackner et al. | |
| 2007/0209349 A1 | 9/2007 | Ripper et al. | |
| 2008/0031801 A1 * | 2/2008 | Lackner et al. | 423/438 |
| 2008/0064184 A1 | 3/2008 | Lackner et al. | |
| 2008/0087165 A1 | 4/2008 | Wright et al. | |
| 2008/0112868 A1 | 5/2008 | Blencoe | |
| 2008/0124666 A1 | 5/2008 | Stocker et al. | |
| 2008/0138265 A1 * | 6/2008 | Lackner et al. | 423/224 |
| 2008/0190567 A1 | 8/2008 | Winsness et al. | |
| 2008/0250715 A1 | 10/2008 | Cooper et al. | |
| 2008/0289495 A1 | 11/2008 | Eisenberger et al. | |
| 2009/0101050 A1 | 4/2009 | Lackner et al. | |
| 2009/0294366 A1 | 12/2009 | Wright et al. | |

FOREIGN PATENT DOCUMENTS

| | | |
|---|---|---|
| EP | 20021234947 A1 | 8/2002 |
| FR | 19842543946 A1 | 10/1984 |
| JP | 2198459216839 | 12/1984 |
| WO | WO9829187 A1 | 7/1998 |
| WO | WO2005026694 A2 | 3/2005 |
| WO | WO2005037746 A1 | 4/2005 |
| WO | WO2006036396 A2 | 8/2005 |
| WO | WO 2006009600 A2 * | 1/2006 |
| WO | WO2007016271 A3 | 2/2007 |

OTHER PUBLICATIONS

English abstract, CN 1 303 910 A (Jul. 18, 2001) as cited in U.S. Patent No. 7,795,175.

English abstract, JP 2006-021989 A (Jan. 26, 2006) as cited in U.S. Patent No. 7,795,175.

Xu et al., "Preparations and characterization of novel CO2 'molecular basket' absorbents based on polymer-modified mesoporous molecular sieve MCM-41." Microporus and Mesoporous Materials 62: 29-45 (2003) as cited in U.S. Patent No. 7,795,175.

International Search Report and Written Opinion of the International Search Authority, dated Dec. 18, 2007, from corresponding International application No. PCT/US2007/074615 as cited in U.S. Patent No. 7,795,175.

* cited by examiner

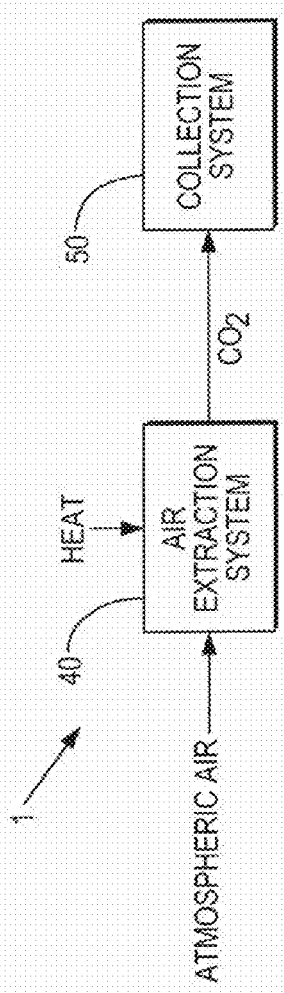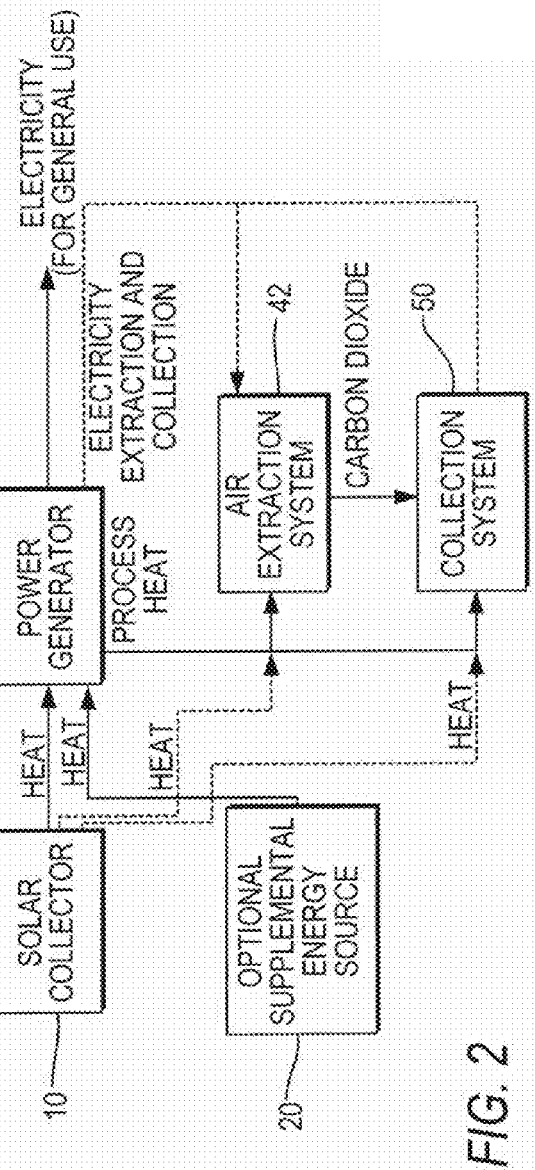

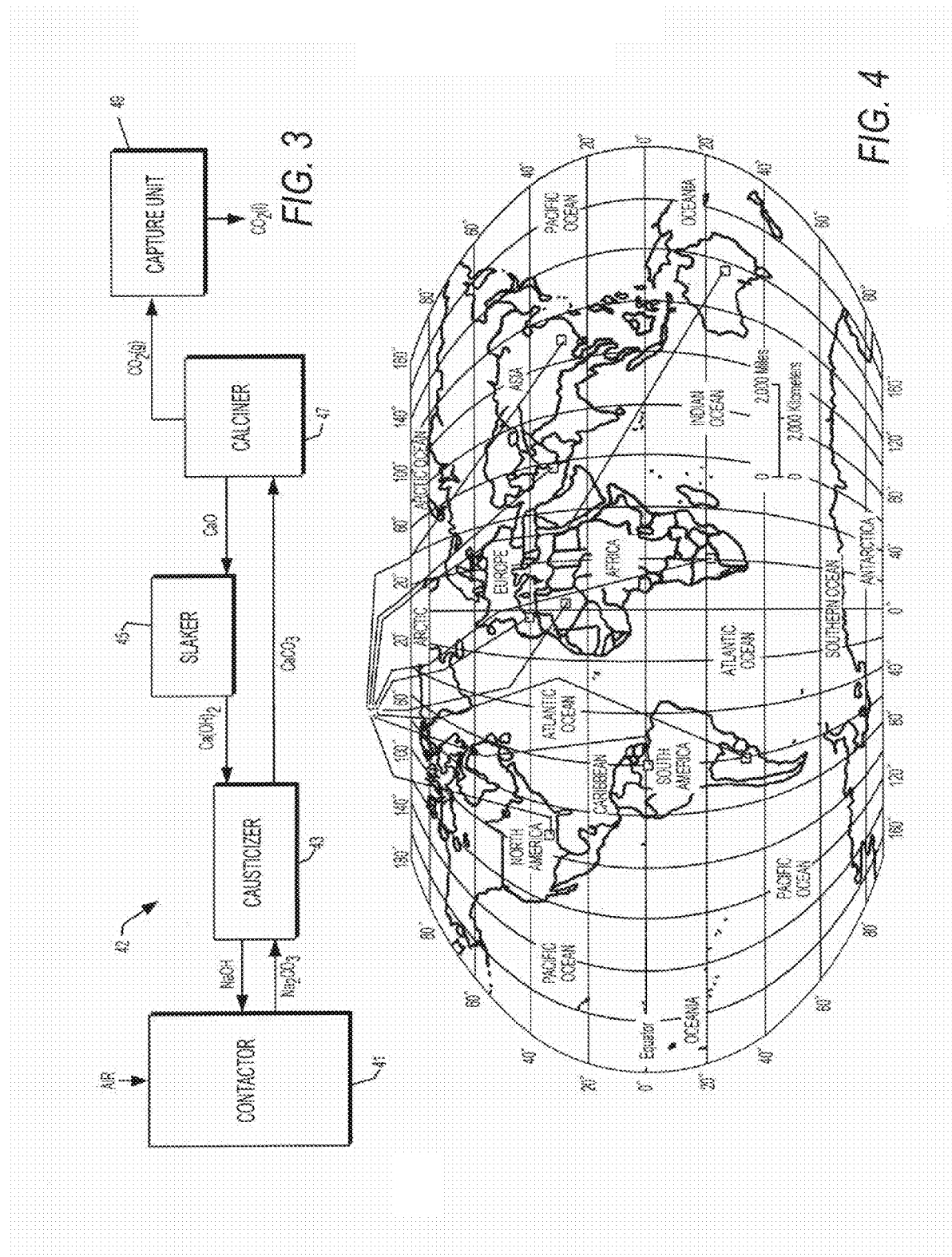

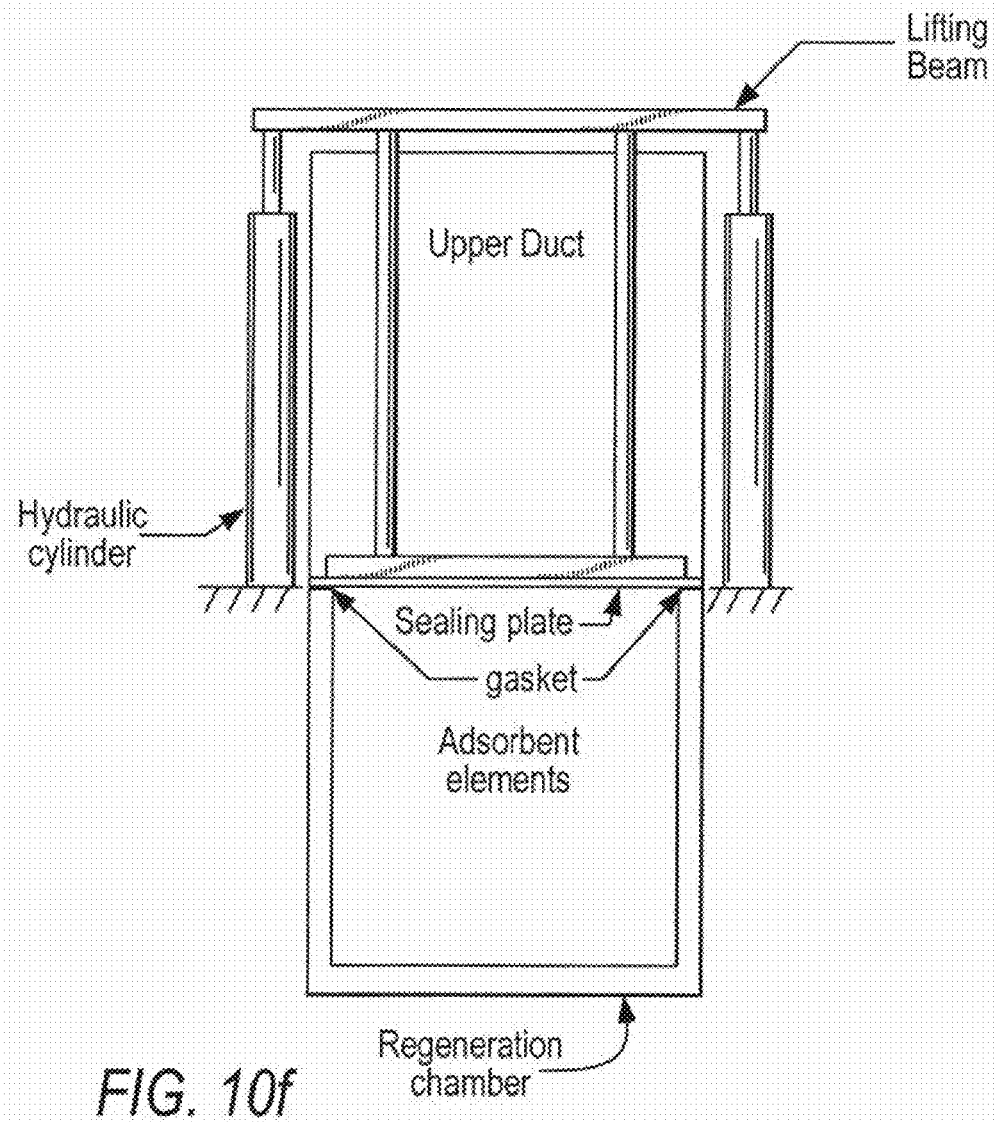

CARBON DIOXIDE CAPTURE/REGENERATION STRUCTURES AND TECHNIQUES

This application claims the benefit of priority pursuant to 35 U.S.C. 119(e) from a U.S. provisional patent application having Application No. 61/210,296 filed Mar. 17, 2009.

RELATED APPLICATION/CLAIM OF PRIORITY

The present invention relates to systems and methods for removing greenhouse gases from an atmosphere, and in particular to systems and methods for removing carbon dioxide from an atmosphere. In addition, the present invention is a continuation in part of, and further develops concepts disclosed in application Ser. No. 12/124,864, filed May 21, 2008, now abandoned, and entitled System and Method for Removing Carbon Dioxide from an Atmosphere and Global Thermostat Using the Same; which is a continuation-in-part of a U.S. patent application Ser. No. 11/825,468 now abandoned, 6236.104US), filed on Jul. 6, 2007, and is a continuation-in-part of U.S. patent application Ser. No. 11/805,477 now abandoned, filed on May 22, 2007, and is a continuation-in-part of U.S. patent application Ser. No. 11/805,271, now abandoned, filed on May 21, 2007, all of which are entitled System and Method For Removing Carbon Dioxide From An Atmosphere and Global Thermostat Using The Same. All of the foregoing applications are incorporated by reference herein.

BACKGROUND

U.S. application Ser. No. 12/124,864

As explained in published U.S. application Ser. No. 12/124,864, a. there is much attention currently focused on trying to achieve three energy related and somewhat conflicting energy related objectives: 1) provide affordable energy for economic development; 2) achieve energy security; and 3) avoid the destructive climate change caused by global warming. Many different approaches are being considered to address climate change, including increasing the use of clean, non polluting renewable energy sources such as biofuels, solar, wind and nuclear, attempting to capture and sequester the carbon dioxide emissions from fossil fuel plants, as well as increased conservation efforts. Some of these approaches, such as solar power, have had their large scale implementation blocked due to their current high costs as compared to the cost of fossil based electricity, and other approaches, such as nuclear, are restrained by their environmental and security risks. In fact, the infrastructure and supply for renewable energy is so underdeveloped (e.g., only about 0.01% of our energy is provided by solar) that there is no feasible way to avoid using fossil fuels during the rest of this century if we are to have the energy needed for economic prosperity and avoid energy shortfalls that could lead to conflict.

b. The climate change threat caused by global warming and the more general recognition of our need to use renewable resources that do not harm our planet has grown steadily since the first Earth Day in 1972. It is mostly undisputed that an increase in the amount of so-called greenhouse gases like carbon dioxide (methane and water vapor are the other major greenhouse gases) will increase the temperature of the planet. These greenhouse gases help reduce the amount of heat that escapes from our planet into the atmosphere. The higher the concentrations of greenhouse gases in the atmosphere the warmer the planet will be. There are complicated feedbacks that cause the amount of carbon dioxide and other greenhouse gases to change naturally even in the absence of human impact. Climate change throughout geological history has caused many extinctions. The concern about the threat of human induced climate change (i.e., global warming) resulted in the Kyoto Protocol that has been approved by over 165 countries and is an international agreement that commits the developed countries to reduce their carbon emissions.

c. One reason global warming is thought by the Intergovernmental Panel on Climate Change (IPCC) to be a threat is because of the sea level rise resulting from the melting of glaciers and the expansion of the ocean as our planet becomes hotter. Hundreds of millions of people who live just above sea level on islands or on the coasts are threatened by destructive flooding requiring relocation or the building of sea walls if the sea level rises even a meter. There is also a threat to other species from climate change which will destroy ecosystems that cannot adjust to the fast rate of human caused climate change. Additional threats include increased infectious diseases and more extreme weather as well as direct threats from extreme heat.

d. The challenge of dealing with global warming can be demonstrated using a simple model. Let $C_{CA}(Y_N)$ represent the carbon dioxide added to the atmosphere in year $Y_N$ in gigatonnes per year. Similarly, let $C_{EX}(Y_N)$ equal the amount extracted, $C_{EM}(Y_N)$ the amount emitted by humans and $C_N(Y_N)$ be the amount either added or removed due to natural variations in the carbon cycle. Today, the land stores each year approximately 1.8 gigatonnes ($10^9$ tonnes) of carbon dioxide and the ocean approximately 10.5 gigatonnes (note carbon dioxide is 3.66 times heavier than carbon), while the amount humans add by emissions is about 24 gigatonnes of carbon dioxide. More generally, we have:

$$C_{CA}(Y_N) = -C_{EX}(Y_N) + C_{EM}(Y_N) + C_N(Y_N)$$

$$C_A(Y_{N+1}) = C_A(Y_N) + C_{CA}(Y_N)$$

where $C_A(Y_N)$ is the amount of carbon in the atmosphere in year $Y_N$, 2780 gigatonnes of carbon dioxide today. Other forms of carbon contribute to global warming, most notably methane, although by weight they represent a small component.

e. If $C_{EX}(Y_N)$ is set to zero then the only way one could possibly stop adding carbon dioxide to the atmosphere would be to reduce our emissions to be equal to the natural uptake. However, $C_N(Y_N)$ itself varies greatly and can be a net addition to the atmosphere from the much larger natural carbon cycle which adds and subtracts carbon at about 750 gigatonnes of carbon per year. It is the shifts in this natural balance that has caused climate change before our species existed and will also continue to do so in the future. Thus, it is clear that there is no solution that only reduces human contributions to carbon dioxide emissions that can remove the risk of climate change. With air extraction and the capability to increase or decrease the amount of carbon dioxide in the atmosphere one can in principle compensate for other greenhouse gases like methane that can change their concentrations and cause climate change.

f. Accordingly, there is a broadly recognized need for a system and method for reducing the amount of carbon dioxide in the atmosphere created by burning of fossil fuels and for providing a low cost, non-polluting renewable energy source as a substitute for fossil fuels.

g. Published U.S. patent application Ser. No. 12/124,864 describes several system and method concepts for addressing that need.

SUMMARY OF THE PRESENT INVENTION

The present invention provides further new and useful system and method concepts for removing carbon dioxide from a mass of carbon dioxide laden air by directing the $CO_2$ laden air through a sorbent structure that binds (captures) $CO_2$, and removing $CO_2$ from the sorbent structure (and thereby effectively regenerating the sorbent structure) by using process heat to heat the sorbent structure. In this application, the sorbent structure preferably comprises an amine that binds $CO_2$, which is carried by a substrate, or forms part of a monolithic sorbent structure. In addition, in this application, reference to a "mass" (or "flow" or "stream") of "$CO_2$ laden air (or carbon dioxide laden air)" means air at a particular location with a concentration of $CO_2$ that is similar to the concentration of $CO_2$ in the atmosphere at that particular location.

In the system and method concepts of published U.S. application Ser. No. 12/124,864, carbon dioxide laden air is directed through a substrate that is coated with (or has embedded in it) a sorbent that absorbs or binds carbon dioxide, to remove the carbon dioxide from the air. Process heat converted into the form of steam or other medium (e.g. gas) is directed at the sorbent, to separate the carbon dioxide from the sorbent (so the carbon dioxide can be drawn off and sequestered), and to regenerate the sorbent (so that the sorbent can continue to be used to remove carbon dioxide from the air).

In one of its basic aspects, this application provides additional structures and techniques for separating carbon dioxide from carbon dioxide laden air, and using process heat to separate carbon dioxide from a sorbent and regenerate the sorbent that further improves the system disclosed in application Ser. No. 12/124,864, and particularly FIG. 6 of that application.

Moreover, in another of its aspects, this application provides some additional structures and techniques that can be used to capture carbon dioxide from carbon dioxide laden air, and using process heat to separate carbon dioxide from a sorbent and regenerate the sorbent, in a manner that enables the carbon dioxide separation and regeneration to be practiced directly in line with a source of flue gases that would otherwise emanate directly from that source and direct carbon dioxide laden air into the atmosphere.

These and other features of this invention are described in, or are apparent from, the following detailed description, and the accompanying drawings and exhibits.

BRIEF DESCRIPTION OF THE FIGURES AND EXHIBITS

FIGS. 1-9 illustrate the system and method concepts described in published U.S. application Ser. No. 12/124,864; Specifically, a. FIG. 1 is a generalized block diagram of a system for removing carbon dioxide from an atmosphere according to an exemplary embodiment of the invention of Ser. No. 12/124,864;

b. FIG. 2 is a block diagram of a system for removing carbon dioxide from an atmosphere according to an exemplary embodiment of the invention of Ser. No. 12/124,864;

c. FIG. 3 is a block diagram of an air extraction system according to an exemplary embodiment of the invention of Ser. No. 12/124,864;

d. FIG. 4 is a map illustrating a global thermostat according to an exemplary embodiment of the invention of Ser. No. 12/124,864;

e. FIG. 5 is a block diagram of a system for removing carbon dioxide from an atmosphere according to an exemplary embodiment of the invention of Ser. No. 12/124,864;

f. FIG. 6 is a schematic illustration of one version of a medium for removing carbon dioxide from an atmosphere and for removing carbon dioxide from the medium, according to the invention of Ser. No. 12/124,864;

g. FIG. 7 is a schematic illustration of another version of a medium for removing carbon dioxide from an atmosphere and for removing carbon dioxide from the medium, according to the invention of Ser. No. 12/124,864;

h. FIG. 8 is a schematic illustration of still another version of a medium for removing carbon dioxide from an atmosphere and for removing carbon dioxide from the medium, according to the invention of Ser. No. 12/124,864; and i. FIG. 9 is a schematic illustration of yet another version of a medium for removing carbon dioxide from an atmosphere and for removing carbon dioxide from the medium, according to the invention of Ser. No. 12/124,864.

FIGS. 10a and 10b schematically illustrate two versions of a structure and technique for removing carbon dioxide from carbon dioxide laden air, and regenerating the sorbent that absorbs or binds the carbon dioxide, according to the principles of the present invention;

Figure 10A:
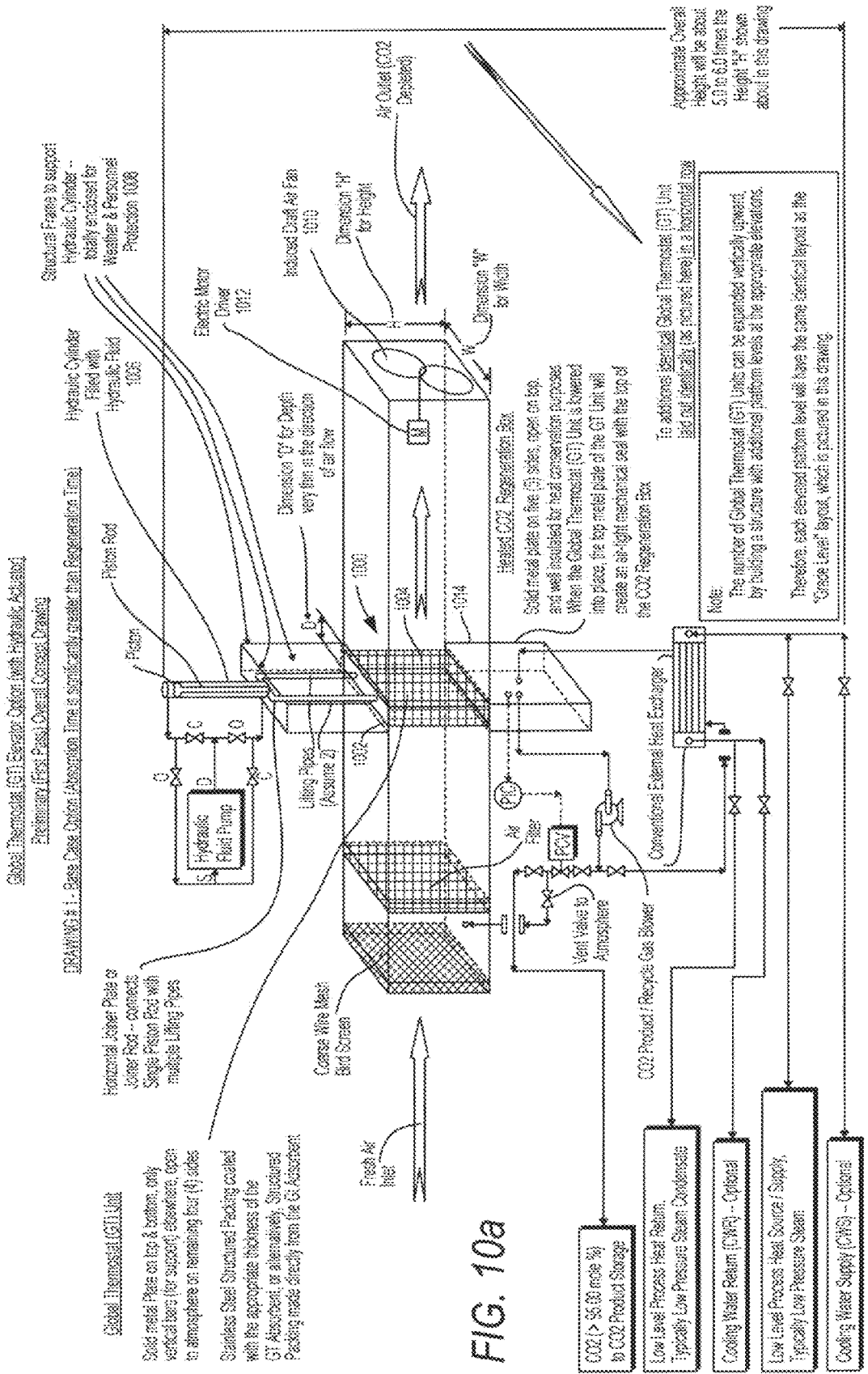
FIGS. 10c and 10d are top and side views of one form of elevator structure for use in the system and method of FIGS. 10a and 10b, in one of its operating positions.
FIGS. 10e and 10f are top and side views of the elevator structure of FIGS. 10c and 10d, in another of its operating positions.
Figures 1, 10B:
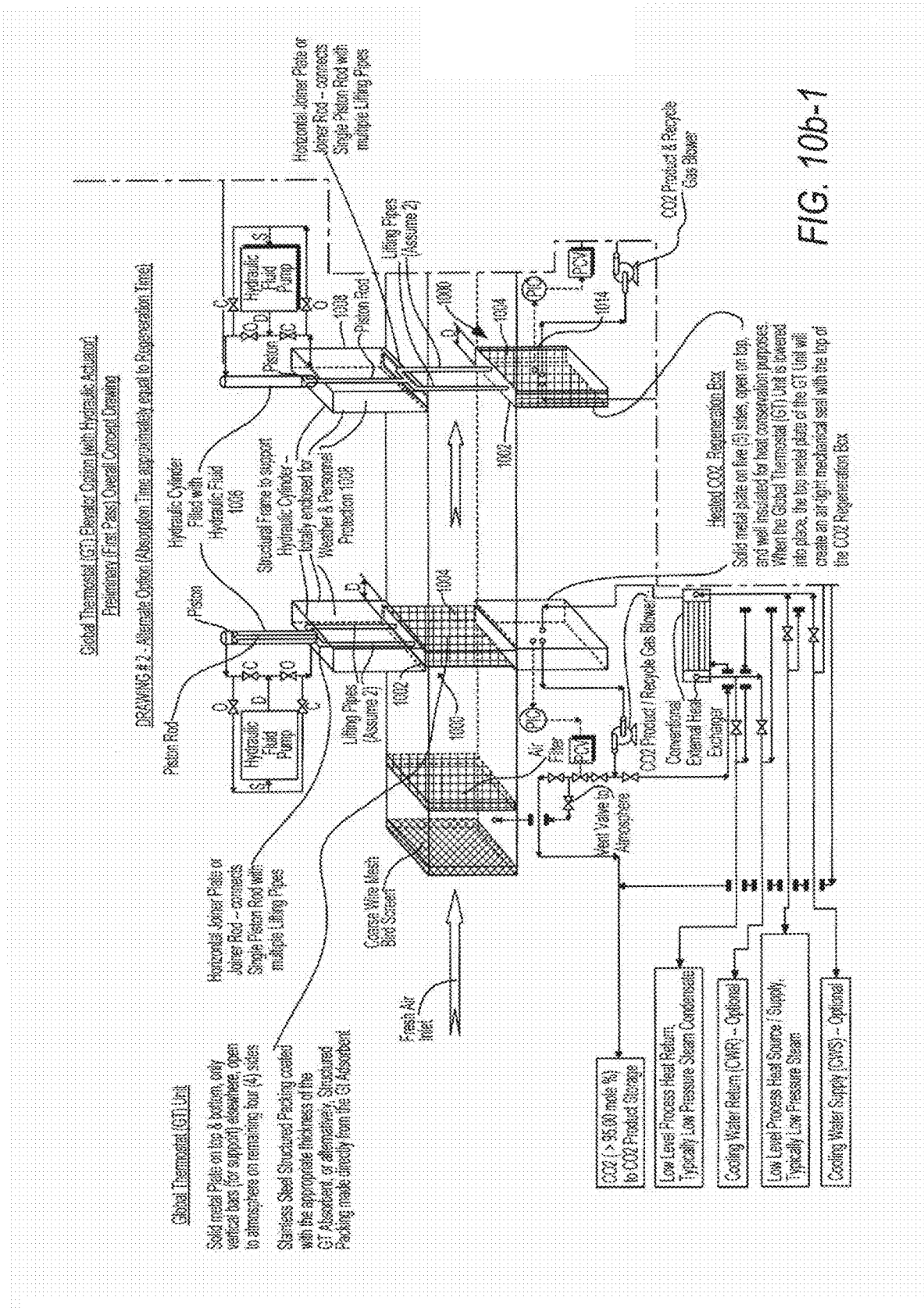
Figures 2, 10B:
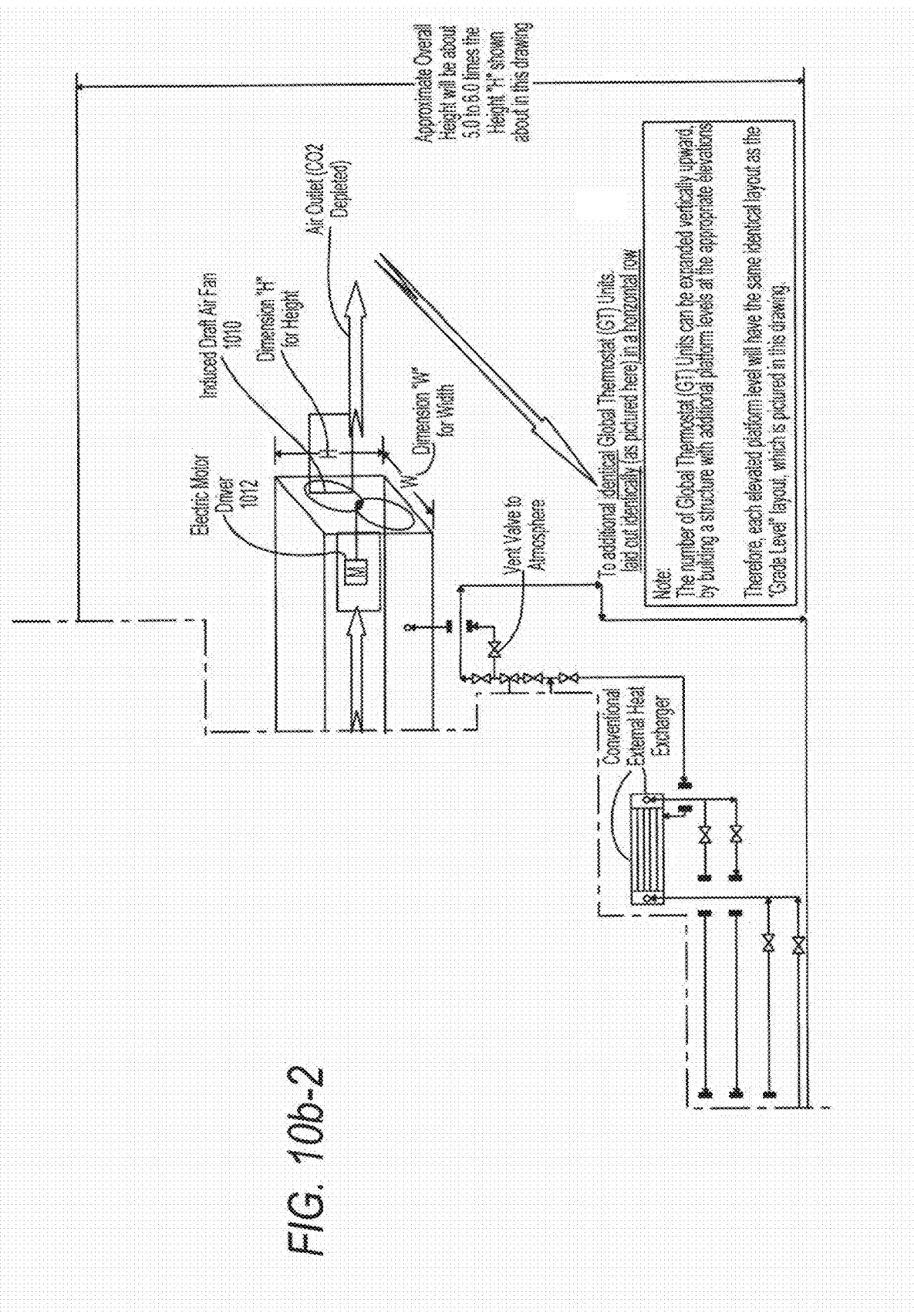
Figures 10C, 10D:
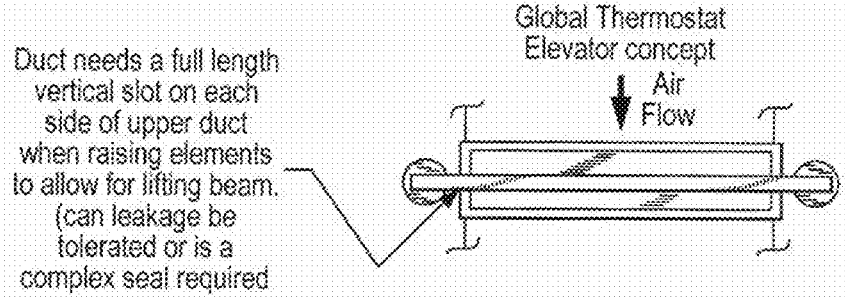
Figure 10G:
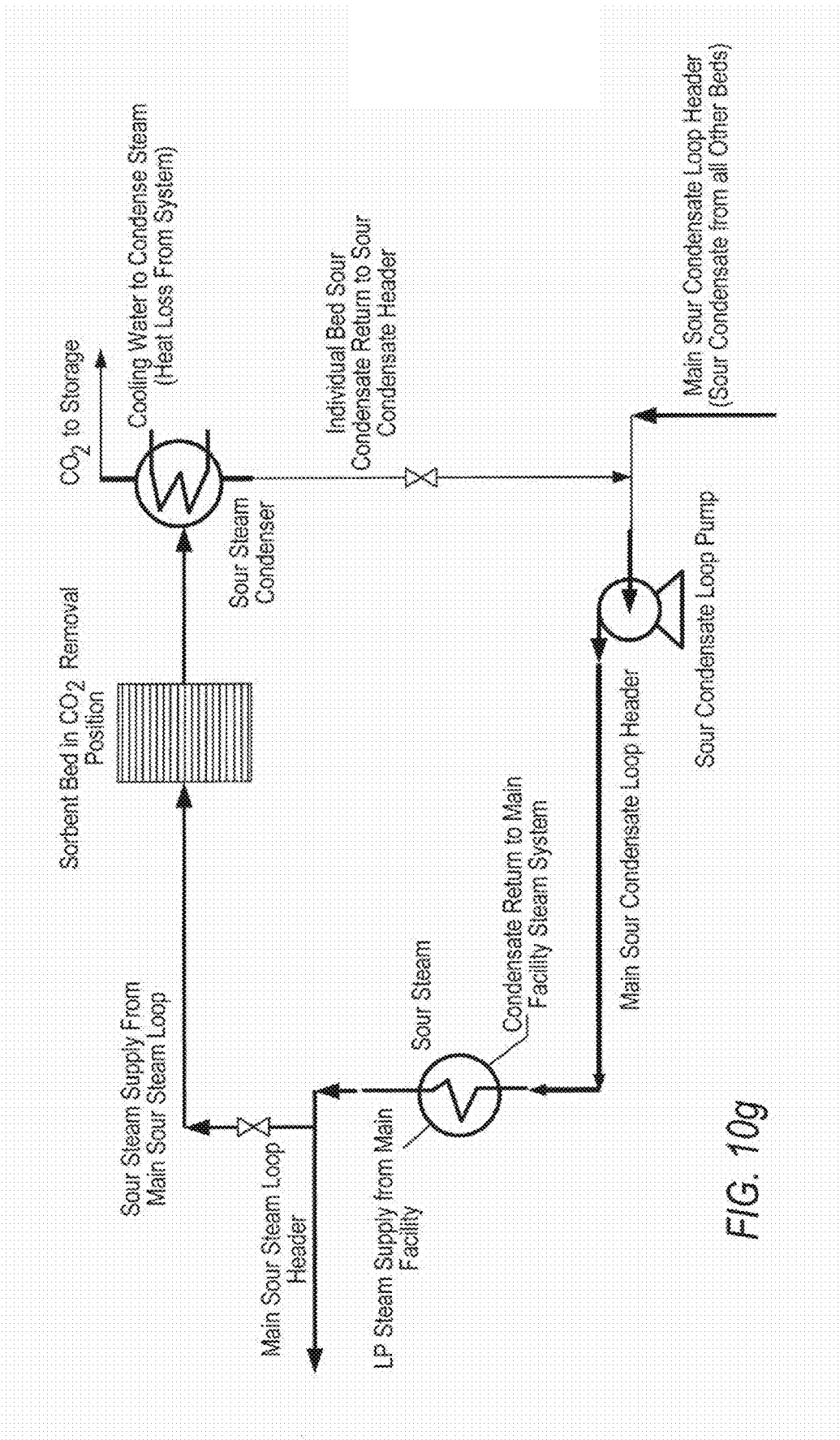
Figure 10H:
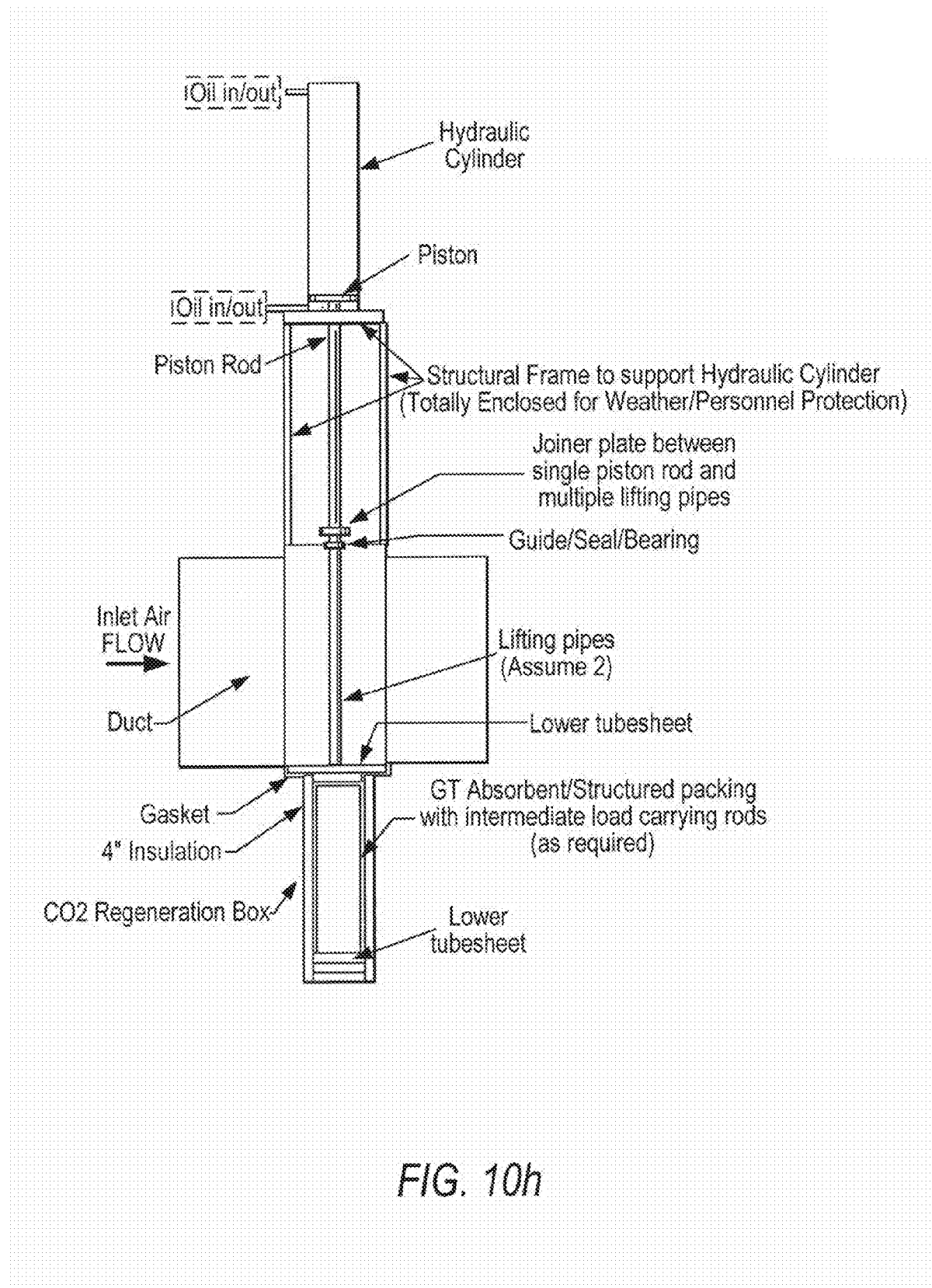
Figure 11A:
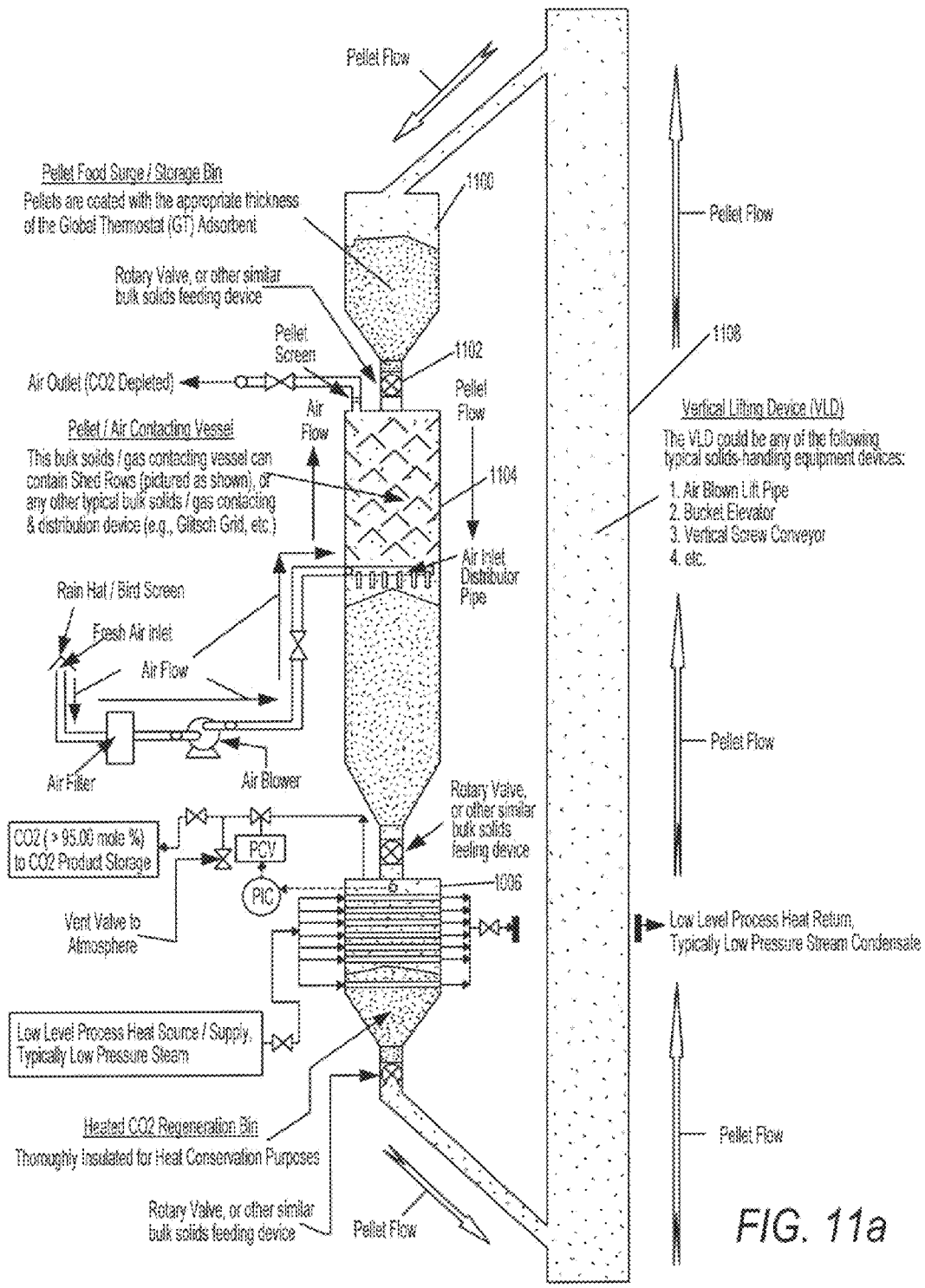
Figure 11B:
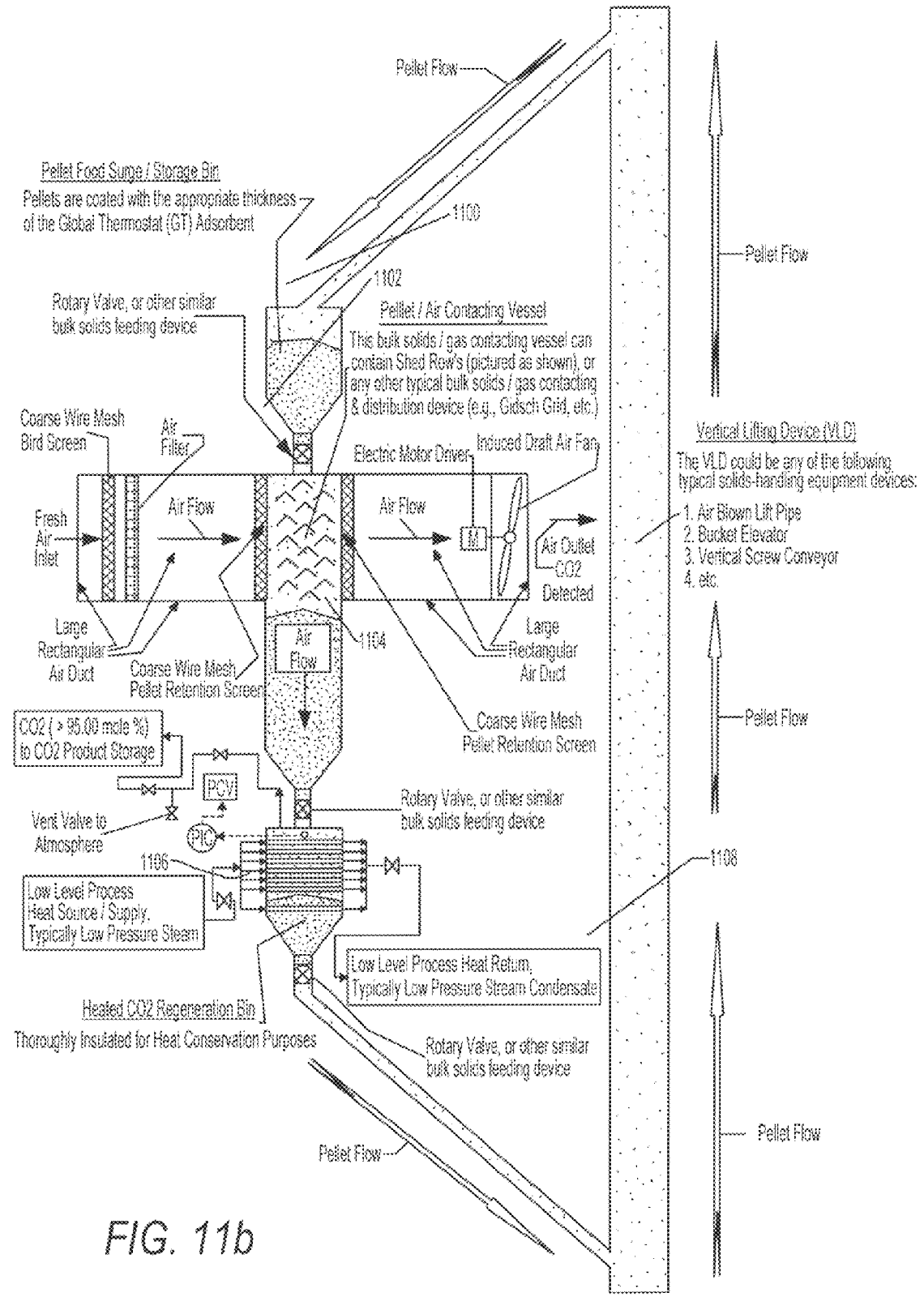
Figure 12:
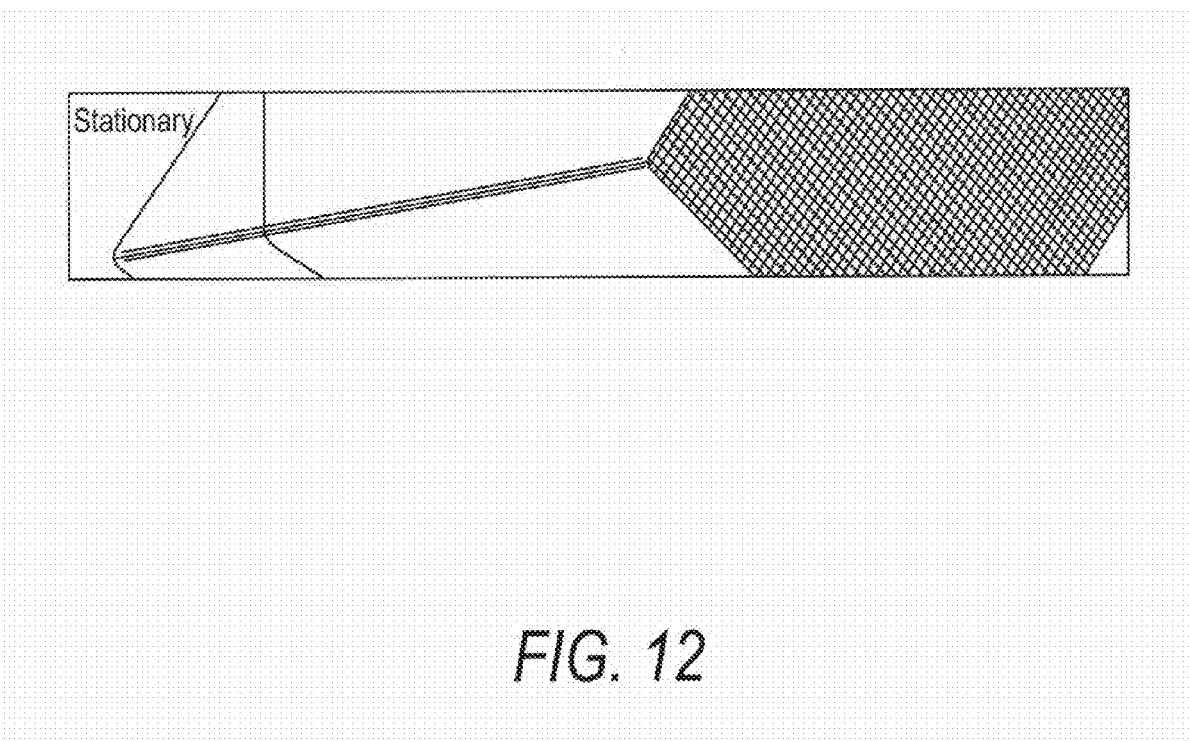

FIG. 10g schematically shows details of structure that can be used to strip the captured $CO_2$ and regenerate the sorbent, in accordance with the principles of the present invention;

FIG. 10h is a schematic, enlarged illustration of the basic principles of the elevator structure of the embodiment of FIGS. 10a and 10b;

FIGS. 11a and 11b schematically illustrate two other versions of a structure and technique for of removing carbon dioxide from carbon dioxide laden air, and regenerating the sorbent that absorbs or binds the carbon dioxide, according to the principles of the present invention;

FIG. 12 is a schematic illustration of a monolithic, sorbent support structure, of a type produced by Corning under the trademark Celcor®, that can be used as a sorbent substrate, in accordance with the principles of the present invention.

Exhibits A-B are enlarged, color images of FIGS. 10a-10b, with narratives that further describe the structure and operation of the embodiments of FIGS. 10a-10b; and Exhibits C and D are enlarged, color images of FIGS. 11a, 11b, with narratives that further describe the structure and operation of the embodiments of FIGS. 11a, 11b.

DETAILED DESCRIPTION

Background Description of the System and Method Concepts of application Ser. No. 12/124,864

Initially, it is believed useful to describe the method and system of U.S. application Ser. No. 12/124,864, to provide background for the additional ways the present invention further develops those principles. FIGS. 1-9 illustrate the system and method of application Ser. No. 12/124,864. FIG. 1 is a generalized block diagram of a system, generally designated by reference number 1, for removing carbon dioxide from an atmosphere according to an exemplary embodiment of the present invention. The system 1 includes an air extraction system 40 and a collection system 50 that isolates the removed carbon dioxide to a location for at least one of sequestration, storage and generation of a renewable carbon fuel or the generation of a non-fuel product such as fertilizer and construction materials (or to be used in green houses or to enhance the rate of microbial production of biofuels). The air extraction system 40 preferably incorporates any known or later-discovered $CO_2$ extraction method, including methods which use a medium (also referred to as a sorbent) to absorb and/or bind (adsorb) $CO_2$ from the atmospheric air by exposing the medium to chemical, electrical and/or physical interaction with the $CO_2$ in the captured air. The medium may be liquid, gaseous or solid, or a combination of liquid, gaseous and solid substances, where in the case of solids, the substance is preferably porous. The medium is preferably recyclable so that after the $CO_2$ is captured by the medium and separated from the medium for sequestration, the medium can be reused for absorption/binding of additional $CO_2$. However, in other embodiments the medium may be sequestered along with the captured $CO_2$. As shown in FIG. 1, the separation of the $CO_2$ from the medium, as well as other processes such as the absorption/binding of $CO_2$ and the sequestration of the $CO_2$ performed by the sequestration system 50, may be made more efficient by the addition of heat to the air extraction system 40. In the present invention, the heat is process heat generated e.g. by a solar energy generator, such as a solar collector, to be described in further detail below. In other embodiments, process heat may be provided by other types of energy sources, such as, for example, fossil fuel, geothermal, nuclear, biomass, and other renewable energy sources. The term "process heat" as used herein refers to the lower temperature heat remaining after the higher temperature heat has been used to generate electricity. More generally, the term "process heat" refers to any low temperature heat remaining after a primary process or that is added by the process itself, such as, for example, exothermic carbonation reactions in which carbon dioxide is stored as a mineral or in fact when it binds to the medium and is captured. Moreover, "process heat" may be provided from the use of sources of energy to produce products other than power or electrical generation. For example, primary processing such as chemical processing, production of cement, steel or aluminum, production of energy products like coal to liquid energy products, refining, may use heat to drive the primary processing, and the unused heat remaining after the primary processing or created during the primary processing would be the process heat of such processing, and can be used in a system or method according to the principles of the present invention. A particularly preferred way of providing process heat is by a co-generation process, in which a primary process (e.g. for generating electricity) provides a source of process heat (either directly in the form of steam, or in a form that can be used to heat a body of liquid to produce steam) and that process heat is further used in the manner described herein to remove $CO_2$ from a substrate and regenerate the sorbent carried by the substrate.

Applicants' preferred concept of extracting carbon dioxide from the atmosphere and using process heat to separate carbon dioxide from the collection medium is a significant way of addressing the global warming problem, and goes against the conventional wisdom in the art (and is counterintuitive to those in the art). Specifically, the use of process heat to solve the global warming problem by extracting carbon dioxide ($CO_2$) from the low concentration ambient air is very attractive compared to both the conventional approach of extracting $CO_2$ from high concentration flue gas sources and other schemes known in the art for extracting $CO_2$ from the ambient atmosphere. In the former case it goes directly against conventional wisdom that 300 times lower concentration of the $CO_2$ in ambient atmosphere would expect it to be 300 times more expensive since separation costs are thought to generally scale inversely with the concentration. Thus federally funded efforts have been directed at extracting $CO_2$ from the flue gas emissions of power plants (e.g. clean coal) and experts have publicly claimed that the use of ambient air as opposed to flue gas makes no sense. However, the large infinite size of the ambient air source compared to the finite flue gas source and sources generally is one feature that enables applicants' approach to be effective in spite of conventional wisdom and practice. In the flue gas case the emissions containing the $CO_2$ are at a higher temperature (65-70 degrees centigrade) and therefore regeneration uses higher temperature heat which is more costly than is needed for the cool ambient air (approximately 25-30 degrees centigrade). There are other benefits of applicants' approach including the ability to use very thin separation devices that also provide further process improvements. Thus, it could be less costly to remove $CO_2$ by piping the process heat to a global thermostat facility that operates on the principles of applicants' invention, rather than cleaning up directly its flue emissions. In addition, the applicants' approach would produce negative carbon, actually reducing the amount of $CO_2$ in the atmosphere, while cleaning up the flue gas would only prevent the $CO_2$ content in the air from increasing.

Further analysis shows that one cannot solve the global warming problem in a timely manner to reduce the great risk it poses by simply cleaning up large stationary fossil fuel sources like coal plants or for that matter by conservation or use of renewables. One needs to actually be able, as is the case in this invention, to extract $CO_2$ from the atmosphere thus reducing the ambient concentration ("negative carbon") and reducing the threat of global warming. Other published schemes for extracting $CO_2$ from the ambient atmosphere have used higher temperature heat generally and not process heat specifically and therefore have not been seriously considered because of their high energy costs.

FIG. 2 is a block diagram of a system, generally designated by reference number 2, for removing carbon dioxide from an atmosphere according to an exemplary embodiment of the present invention. The system 2 includes a solar collector 10, an optional supplemental energy source 20, a power generator 30, an air extraction system 42 and a collection system 50. Each of these components of the system 1 are explained in detail below.

The solar collector 10 may be any known or future-discovered solar energy collection system, which may include solar energy collection units, such as, for example, concentrated solar power parabolic mirrors, and concentrated solar power towers. As is known in the art, the solar collector 10 converts solar energy to thermal energy, which may be used to drive the power generator 30. Residual thermal energy (i.e., process heat) may be used to drive the air extraction system 42 and/or the collection system 50. For example, the process heat may be used to improve the efficiency of chemical and/or physical reactions used in the air extraction system 42 to absorb $CO_2$ from the air and/or to drive off the $CO_2$ from the medium. In addition, in other exemplary embodiments, as shown by the dashed arrows in FIG. 2, direct heat from the solar collector 10 may be used to drive the air extraction system 42 and/or the collection system 50.

The power generator 30 may be, for example, a thermal power generator that converts the thermal energy provided by the solar collector to electricity. As is known in the art, the sun's heat may be focused on a medium, such as molten salts, that is then used to generate high temperature, high pressure steam that drives a turbine to generate electricity. The generated electricity may then be used to power the other components of the system 2, in addition to providing power to the general population as part of a power grid. In this regard, the thermal energy provided by the solar collector 10 may be supplemented by energy generated by the supplemental energy source 20. For example, the supplemental energy source 20 may be a waste incineration plant, which provides additional thermal energy to drive the power generator 30. Also, it should be appreciated that any other type of renewable energy source may be used in addition to solar energy, and preferably a renewable energy source that produces heat as a precursor to the generation of electricity. Other potential renewable energy sources to be used in addition to solar energy include, for example, nuclear, biomass, and geothermal energy sources.

Alternatively, the power generator 30 may be any known or later discovered fossil fuel facility (plant) that relies on the burning of fossil fuels, such as, for example, coal, fuel oil, natural gas and oil shale, for the generation of electricity. The power generator may also be for a purpose other than generating electricity (for example the power generator could be for chemical processing, or various other purposes like producing aluminum). The thermal energy produced by the fossil fuel power plant 30 is used to produce electricity and the residual thermal energy (i.e., process heat) may be used to drive the air extraction system 42 and/or the sequestration system 50. For example, the process heat from the fossil fuel power plant 30 may be used to improve the efficiency of chemical and/or physical reactions used in the air extraction system 42 to absorb/bind $CO_2$ from the air and/or to drive off the $CO_2$ from the medium. The process heat provided by the fossil fuel power plant 30 may be supplemented by energy generated by a supplemental energy source. For example, the supplemental energy source may be a waste incineration plant or a renewable energy source, such as, for example, solar, nuclear, biomass, and geothermal energy sources, which provides additional thermal energy to drive the air extraction system 42 and/or the collection system 50. Process heat from the supplemental energy source may also be used to drive the air extraction system 42 and/or the collection system 50.

Moreover, as described above, "process heat" may be provided from the use of sources of energy to produce products other than power or electrical generation. For example, in a co-generation system, primary processing such as chemical processing, production of cement, steel or aluminum, refining, production of energy products like coal and liquid energy products, may use heat to drive the primary processing, and the unused heat remaining after the primary processing or created during the primary processing would be the process heat of such processing, and can be used in a system or method according to the principles of the present invention. When the primary processing is for generating electricity, the process heat is produced in the form of steam (or in a form that can heat a body of fluid to produce steam), and that steam is used in the manner described herein to remove $CO_2$ from a substrate and regenerate the sorbent carried by the substrate.

FIG. 3 is a block diagram of the air extractor system 42 useable with the system 2 according to an exemplary embodiment of the present invention. The air extractor system 42 includes an air contactor 41, a causticizer 43, a slaker 45, a calciner 47 and a capture unit 49. The air contactor 41 may use a sorbent material to selectively capture $CO_2$ from the air, and may be composed of any known or later-discovered contactor structures, such as, for example, large convection towers, open, stagnant pools, and packed scrubbing towers. In the present embodiment, the sorbent material which readily absorbs/binds $CO_2$ from the air may be an amine that can operate (e.g. capture $CO_2$, and be processed to collect the $CO_2$ and regenerate the sorbent) at relatively low temperature (e.g. below about 120 degrees C.) or sodium hydroxide (NaOH) which would operate at significantly higher temperature. It should be appreciated that other known or future-discovered capture methods may be used, such as, for example, chemical absorption, physical and chemical adsorption, low-temperature distillation, gas-separation membranes, mineralization/biomineralization and vegetation. As a further example, as known in the art, aqueous amine solutions or amine enriched solid sorbents may be used to absorb/bind $CO_2$. Preferably, the sorbent material is regenerated and the capture method requires less than about 100-120° C. heat to regenerate the sorbent material. Thus, the preferred sorbent material is an amine. It should also be noted that future improved sorbents with the ability to be regenerated with low temperature heat could also be used. Moreover, a sorbent such as NaOH (because of its need for high temperature) would only be useable in a co-generation mode of this invention for processes that have higher temperature process heat available after completing the primary process for which the heat is generated, e.g. steel manufacturing. However, because at this time this heat is much less available, and more costly, its use could limit the full scope of this invention to the effect that it might not adequately address climate change, and the use of NaOH as a sorbent is therefore not preferred at this time.

The capture unit 49 captures the $CO_2$ driven off at the calciner 47 using any know or later-discovered $CO_2$ capturing method that is effective in the low concentrations in which $CO_2$ is present in the atmosphere and that needs only low temperature heat for regeneration. For example, the capture unit 49 may use an amine based capture system, such as the system described in Gray et al U.S. Pat. No. 6,547,854, dated Apr. 15, 2003, and also Sirwardane U.S. Pat. No. 6,908,497, dated Jun. 21, 2005, both of which are incorporated herein by reference. The capture unit 49 may also compress the captured $CO_2$ to liquid form so that the $CO_2$ may be more easily sequestered.

The collection system 50 isolates the removed carbon dioxide to a location for at least one of sequestration, storage and generation of a renewable carbon fuel or the generation of a non-fuel product such as fertilizer and construction materials. The collection system 50 may use any known or future-discovered carbon, sequestration and/or storing techniques, such as, for example, injection into geologic formations or mineral sequestration. In the case of injection, the captured $CO_2$ may be sequestered in geologic formations such as, for example, oil and gas reservoirs, unmineable coal seams and deep saline reservoirs. In this regard, in many cases, injection of $CO_2$ into a geologic formation may enhance the recovery of hydrocarbons, providing the value-added byproducts that can offset the cost of $CO_2$ capture and collection. For example, injection of $CO_2$ into an oil or natural gas reservoir pushes out the product in a process known as enhanced oil recovery. The captured $CO_2$ may be sequestered underground, and according to at least one embodiment of the invention at a remote site upwind from the other components of the system 2 so that any leakage from the site is re-captured by the system 2.

In regards to mineral sequestration, $CO_2$ may be sequestered by a carbonation reaction with calcium and magnesium silicates, which occur naturally as mineral deposits. For example, as shown in reactions (1) and (2) below, $CO_2$ may be reacted with forsterite and serpentine, which produces solid calcium and magnesium carbonates in an exothermic reaction.

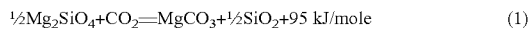
$$\tfrac{1}{2}Mg_2SiO_4 + CO_2 = MgCO_3 + \tfrac{1}{2}SiO_2 + 95 \text{ kJ/mole} \quad (1)$$

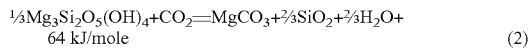
$$\tfrac{1}{3}Mg_3Si_2O_5(OH)_4 + CO_2 = MgCO_3 + \tfrac{2}{3}SiO_2 + \tfrac{2}{3}H_2O + 64 \text{ kJ/mole} \quad (2)$$

Both of these reactions are favored at low temperatures, which favor an amine as the sorbent. In this regard, both the air capture and air sequestration processes described herein may use electricity and/or thermal energy generated by the solar collector 10 (or other renewable energy source) to drive the necessary reactions and power the appropriate system components. In an exemplary embodiment of the present invention, a high temperature carrier may be heated up to a temperature in a range of about 400° C. to about 500° C. to generate steam to run a generator for electricity, and the lower temperature and pressure steam that exits from the electrical generating turbines can be used to drive off the $CO_2$ and regenerate the sorbent (e.g., an amine at low temperatures or NaOH at higher temperatures). The temperature of the high temperature heat, the generated electricity and the temperature of the lower temperature process heat remaining after electricity production can be adjusted to produce the mix of electricity production and $CO_2$ removal that is considered optimal for a given co-generation application. In addition, in exemplary embodiments, still lower temperature process heat that emerges out of the capture and sequestration steps may be used to cool equipment used in these steps.

One or more systems for removing carbon dioxide from an atmosphere May be used as part of a global thermostat according to an exemplary embodiment of the present invention. By regulating the amount of carbon dioxide in the atmosphere and hence the greenhouse effect caused by carbon dioxide and other gas emissions, the system described herein may be used to alter the global average temperature. According to at least one exemplary embodiment of the present invention, several carbon dioxide capture and sequestration systems may be located at different locations across the globe so that operation of the multiple systems may be used to alter the $CO_2$ concentration in the atmosphere and thus change the greenhouse gas heating of the planet. Locations may be chosen so as to have the most effect on areas such as large industrial centers and highly populated cities, or natural point sources of $CO_2$ each of which could create locally higher concentrations of $CO_2$ that would enable more cost efficient capture. For example, as shown in FIG. 4, multiple systems 1 may be scattered across the globe, and international cooperation, including, for example, international funding and agreements, may be used to regulate the construction and control of the systems 1. In this regard, greenhouse gases concentration can be changed to alter the average global temperature of the planet to avoid cooling and warming periods, which can be destructive to human and ecological systems. During the past history of our planet, for example, there have been many periods of glaciation and rapid temperature swings that have caused destruction and even mass extinctions. Such temperature swings in the future could be a direct cause of massive damage and destabilization of human society from conflicts resulting from potential diminished resources. The global thermostat described herein may be the key to preventing such disasters in the decades to come.

Figure 5:
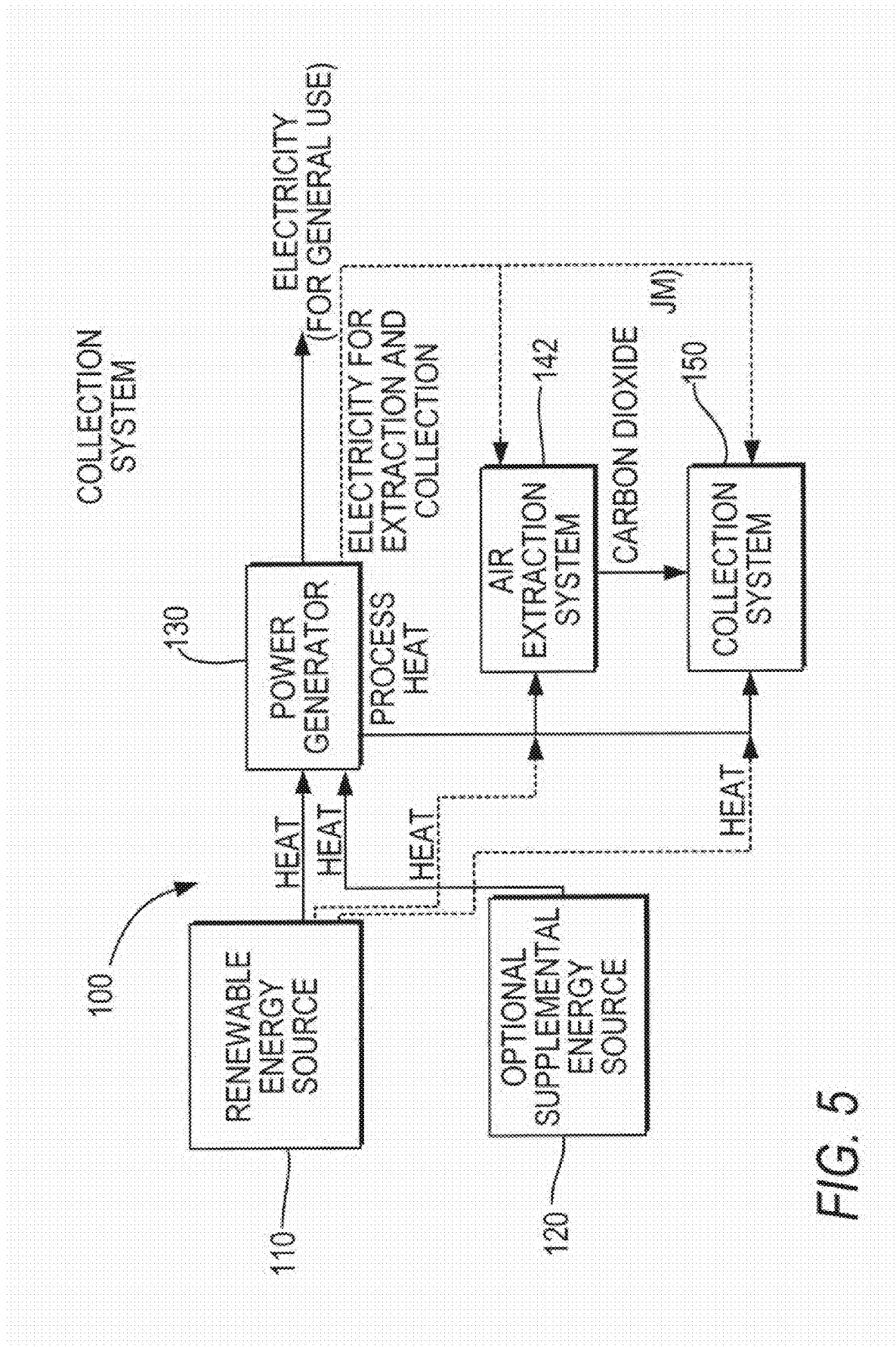

FIG. 5 is a block diagram of a system, generally designated by reference number 100, for removing carbon dioxide from an atmosphere according to another exemplary embodiment of the present invention. The system 100 includes a renewable energy source 110, an optional supplemental energy source 120, a power generator 130, an air extraction system 142 and a collection system 150. The present embodiment differs from the embodiment of FIG. 2 in that the renewable energy source 110 may be any known or future-discovered energy source besides solar, such as, for example, nuclear, geothermal, and biomass energy sources. Preferably, the renewal energy source produces thermal energy, which can be used to produce electricity and to improve the efficiency of the various chemical and/or physical reactions that take place within the air extraction system 142 and the collection system 150. In this regard, the air extraction system 142 and the collection system 150 may be the same as described with reference to the previous embodiment, or may include components according to any other known or future-discovered air extraction and collection systems. In addition, as shown in FIG. 4 with reference to the previous embodiment, a plurality of systems 100 may be strategically placed across the globe, and control of the systems 100 may be coordinated so as to collectively function as a global thermostat.

FIGS. 6-9 are schematic illustrations of several ways that carbon dioxide can be removed from an atmosphere, according to the principles of the present invention.

Figure 6:
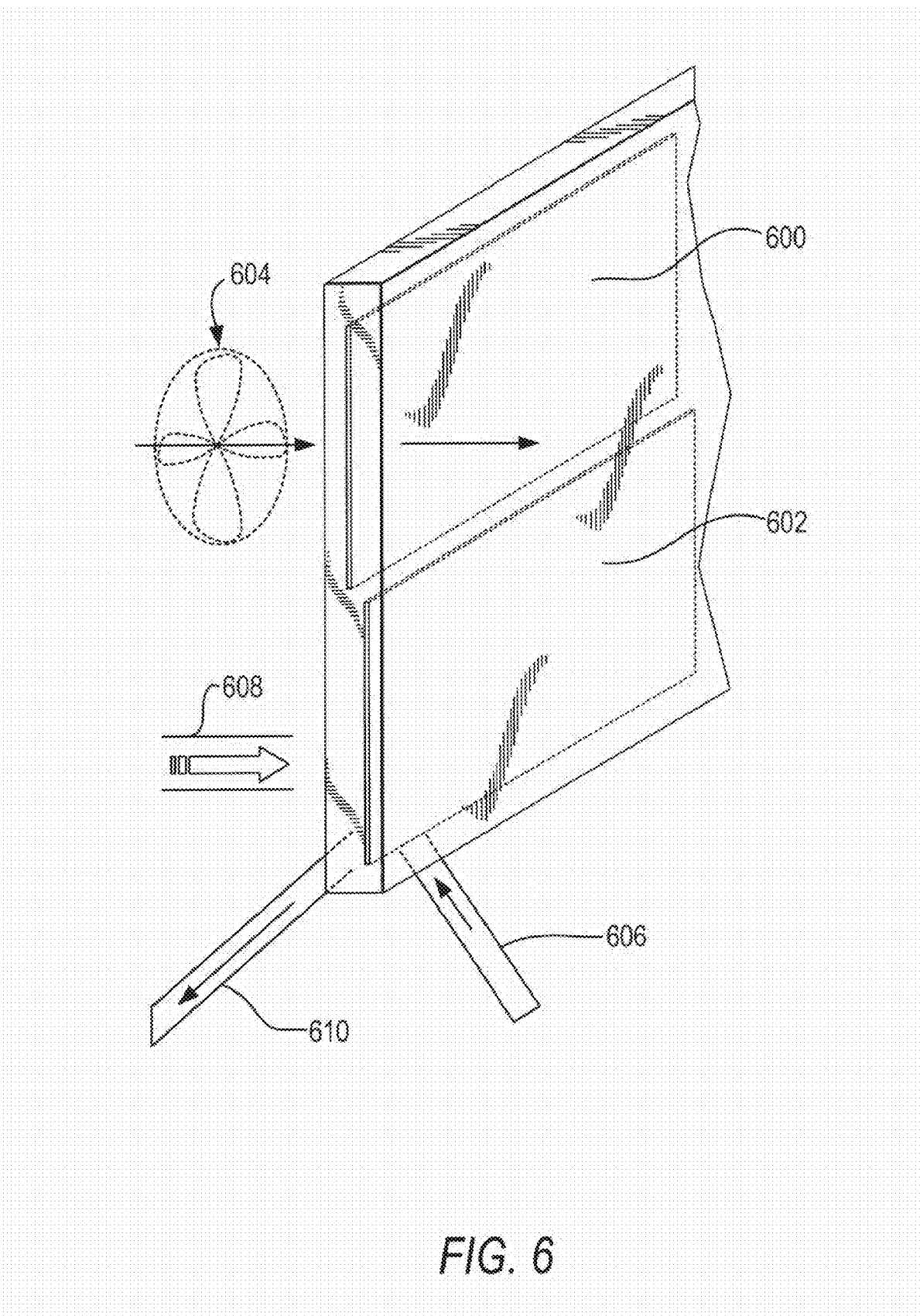

Specifically, in FIG. 6, a pair of substrates 600, 602 are illustrated, each of which has a medium (e.g. NAOH, an amine or other suitable sorbent) that can be brought into contact with an atmosphere to remove carbon dioxide from the atmosphere. The substrates 600, 602 are pancake shaped (in the sense that they are relatively large area compared to their thickness) oriented vertically, and can each be relatively large (in surface area) and relatively thin (e.g. on the order of a few millimeters, and preferably not thicker than a meter). Each substrate can move (e.g. by a pulley or hydraulic system, not shown) between an upper position in which carbon dioxide laden air is brought into contact with the medium carried by the substrate to remove carbon dioxide from the air, and a lower position in which process heat is directed at the substrate to remove carbon dioxide from the medium. The substrates 600, 602 are porous with large surface areas, so that air directed at a substrate can flow through the substrate. When a substrate is in an upper position (e.g. the position of substrate 600), carbon dioxide laden air is directed at the substrate (e.g. by a fan 604 shown in dashed lines), so that as the air flows through the substrate, the carbon dioxide contacts the medium and is substantially removed from the air. Thus, carbon dioxide laden air is directed at and through the substrate so that carbon dioxide comes into contact with the medium, carbon dioxide is substantially removed from the air by the medium, and air from which the carbon dioxide has been substantially removed is directed away from the substrate. When a substrate is moved to the lower position (e.g. the position of substrate 602), process heat is directed at the substrate (e.g. via a fluid conduit 606), and carbon dioxide is removed (drawn off) by a source of fluid that is directed at the substrate (in the direction shown by arrow 608) and a source of suction 610 by which carbon dioxide that has been removed from the medium is drawn away from the substrate. The substrates 600, 602 can alternatively move between the upper and lower positions, so that the substrate in the upper position is removing carbon dioxide from the air and carbon dioxide is being removed from the substrate in the lower position. It should be noted that rather than the fan, if there are strong winds available natural wind flows can be used to drive the air through the substrate. In addition, as described below, the fan can be replaced with a solar driven source (or by either wind or thermally-driven air currents), in which case the efficiency and cost reduction of extraction of carbon dioxide from atmospheric air can be further improved. Moreover, rather than switching the positions of the substrates, the means for generating the air flows, the flow of process heat, and the flow of carbon dioxide away from the substrate can be switched as carbon dioxide is captured from the air and then extracted from the medium, as will be readily apparent to those in the art.

Figure 7:
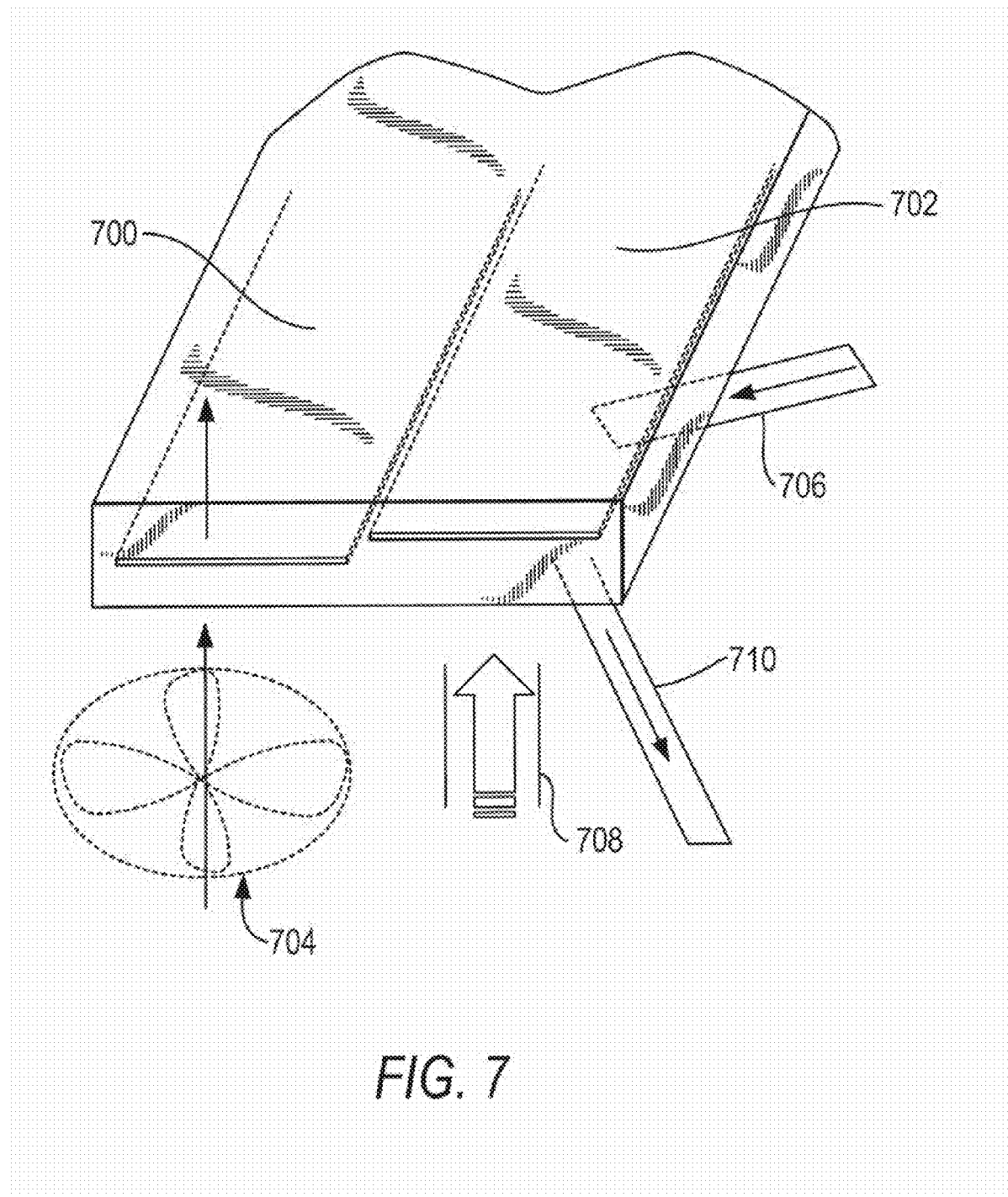

FIG. 7 is a schematic illustration of another version of a medium for removing carbon dioxide from an atmosphere and for removing carbon dioxide from the medium, according to the principles of the present invention. Specifically, in FIG. 7, a pair of substrates 700, 702 are illustrated, each of which has a medium (e.g. NAOH, an amine or other suitable sorbent) that can be brought into contact with an atmosphere to remove carbon dioxide from the atmosphere. The substrates 700, 702 are oriented horizontally, and can each be relatively large (in surface area) and relatively thin (e.g. on the order of millimeters or centimeters, up to a meter). Each substrate can move horizontally (e.g. by a pulley system (not shown) between an air extraction position in which carbon dioxide laden air is brought into contact with the medium carried by the substrate to remove carbon dioxide from the air, and a carbon extraction position in which process heat is directed at the substrate to remove carbon dioxide from the medium. The substrates 700, 702 are porous, so that air directed at a substrate can flow through the substrate. When a substrate is in an air extraction position (e.g. the position of substrate 700), carbon dioxide laden air is directed at the substrate (e.g. by a fan 704 shown in dashed lines), so that as the air flows through the substrate, the carbon dioxide contacts the medium and is substantially removed from the air. Thus, carbon dioxide laden air is directed at and through the substrate so that carbon dioxide comes into contact with the medium, carbon dioxide is substantially removed from the air by the medium, and air from which the carbon dioxide has been substantially removed is directed away from the substrate. When a substrate is moved to the carbon extraction position (e.g. the position of substrate 702), process heat is directed at the substrate (e.g. via a fluid conduit 706), and carbon dioxide is removed (drawn off) by a source of fluid that is directed at the substrate (in the direction shown by arrow 708) and a source of suction 710 by which carbon dioxide that has been removed from the medium is drawn away from the substrate. The substrates 700, 702 can alternatively move between the air extraction and carbon extraction positions, so that the substrate in the air extraction position is removing carbon dioxide from the air and carbon dioxide is being removed from the substrate in the carbon extraction position. It should be noted that rather than the fan, if there are strong winds available natural wind flows can be used to drive the air through the substrate. In addition, as described below, the fan can be replaced with a solar driven source (or by either wind or thermally-driven air currents), in which case the efficiency and cost reduction of extraction of carbon dioxide from atmospheric air can be further improved. Moreover, rather than switching the positions of the substrates, the means for generating the air flows, the flow of process heat, and the flow of carbon dioxide away from the substrate can be switched as carbon dioxide is captured from the air and then extracted from the medium, as will be readily apparent to those in the art.

Figure 9:
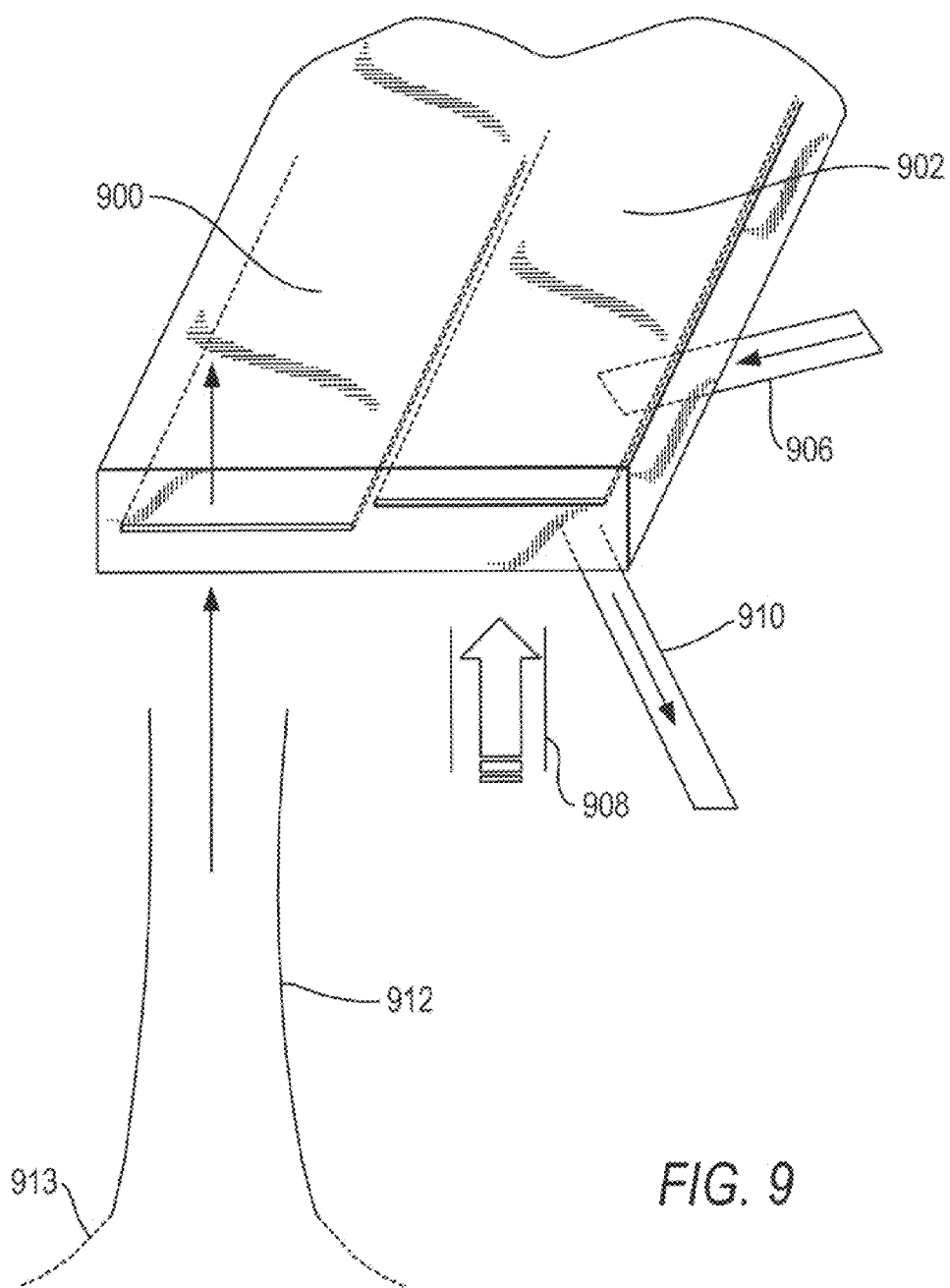

The version of the invention shown in FIG. 9 is generally similar to the horizontally oriented version of FIG. 7, but in the version of FIG. 9, rather than a fan being the source that moves the carbon laden air through the substrate in the air extraction position (e.g. substrate 900), there is a source of gas flow that is generated from a solar heating tower or chimney (shown schematically at 912 in FIG. 9). A solar chimney can be generated by heating an air mass with the sun. The solar chimney would have a "skirt" (shown in dashed lines 913 in FIG. 9) that enables the solar heated air to be concentrated in the chimney. Thus, a solar field with a solar chimney can be associated with a system and structure that removes carbon dioxide from the atmosphere and removes carbon dioxide from a medium in the manner shown and described in connection with FIG. 7. However, rather than a fan 704 as the primary driver of carbon dioxide laden air at the substrate, the carbon dioxide laden air is heated by solar energy and that air is allowed to rise in the solar funnel or tower 912. Because of the tendency for the hot air to rise, an upward draft is generated, that would carry with it carbon dioxide laden air, and the substrate 900 would be positioned in the way of that upward draft. Thus, the carbon dioxide laden air would be directed through the substrate 900 in the air extraction position, and carbon dioxide would be removed from the substrate 902 in the carbon extraction position in the same way as shown and described in connection with FIG. 7. By driving the extraction of carbon dioxide from air by solar energy, the costs of extraction are further reduced, and the overall operation is highly renewable. Of course, provision would need to be made for those periods when the sun didn't shine, and some form of driver similar to the fan 704 (FIG. 7) would be needed. But in any case, having periods in which, instead of the fan, replacing the fan with a solar driven source (or by either wind or thermally-driven air currents), the efficiency and cost reduction of extraction of carbon dioxide from atmospheric air can be further improved.

Figure 8:
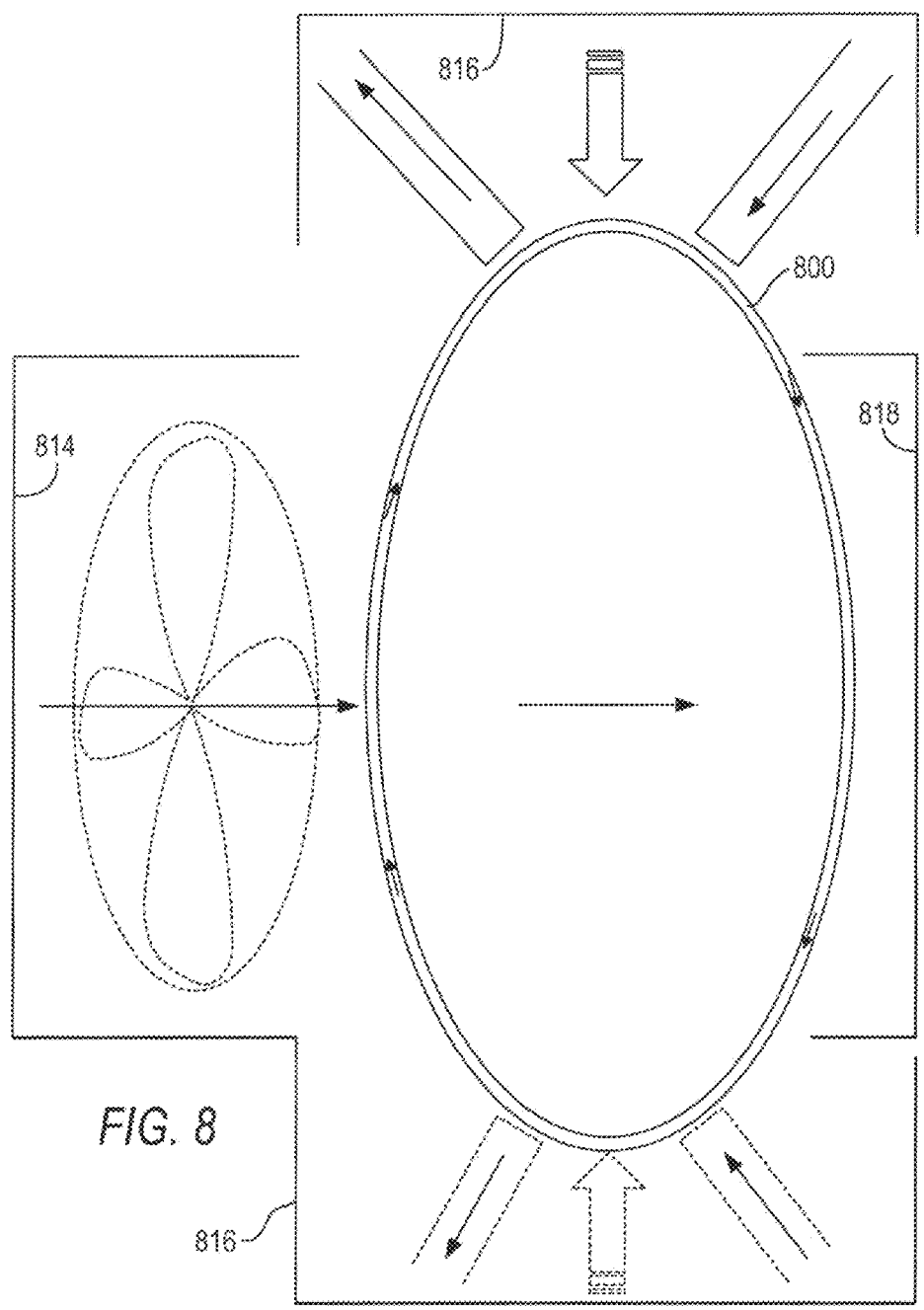

FIG. 8 is a schematic illustration of yet another version of a medium for removing carbon dioxide from an atmosphere and for removing carbon dioxide from the medium, according to the principles of the present invention. In FIG. 8, the medium from which carbon dioxide is removed from atmospheric air and from which carbon dioxide is removed from the medium is disposed on a continuously moving substrate composed, e.g., of pellets laden with the sorbent 800. The substrate moves through an air extraction zone 814, where carbon dioxide laden air is directed at and through the substrate (which is also porous as with the prior embodiments) so that carbon dioxide is removed from the air. The substrate 800 then moves to a carbon extraction zone 816, where process heat is directed at the substrate and carbon is drawn away from the substrate in the manner described above in connection with FIGS. 6, 7. Then, the substrate 800 moves to and through a heat exchange zone 818 where the temperature of the substrate is lowered (e.g. by the air that flowed through the substrate in the air extraction zone, and by any additional cooling device that may be useful in reducing the temperature of the substrate to a level that enables it to efficiently remove carbon dioxide from the air when the substrate moves back through the extraction zone 814. In addition, the system of FIG. 8 may have another carbon extraction zone 816, where process heat is directed at the substrate and carbon is drawn away from the substrate in the manner described above in connection with FIGS. 6, 7.

It should also be noted that in all of the versions of the invention described above, the removal of carbon dioxide from the air can be at least partially performed under non equilibrium conditions. Additionally, it should be noted that applicants' preferred concept for extracting carbon dioxide from the atmosphere comprises using a relatively thin, large surface area substrate with a medium (e.g. an amine) that removes carbon dioxide from the atmosphere and using process heat to remove carbon dioxide from the medium. Using a relatively large area substrate perpendicular to the direction of air flow is particularly useful, because of the relatively low concentration of carbon dioxide in the atmosphere (as opposed to the relatively high concentration that would normally be found, e.g. in flue gases).

New System, Components and Method Concepts for Removing Carbon Dioxide from Carbon Dioxide Laden Air, According to the Present Invention Sorbent Structure and General Operation of Sorbent.

FIG. 12 is a schematic illustration of a cellular, ceramic substrate structure, of a type produced by Corning under the trademark Celcor®, that can be used in a sorbent structure, in accordance with the principles of the present invention. The sorbent (e.g. an amine) is carried by (e.g. coated or otherwise immobilized on) the inside of one or more of the Celcor®, cellular ceramic substrates, which provides a high surface area and low pressure drop, as $CO_2$ laden air flows through the substrate. The sorbent structure can comprise, e.g., a plurality of the Celcor,® cellular, ceramic substrates or a single substrate, having the type of pancake shape described above in connection with FIG. 6 (i.e. surface area much greater than thickness), and the $CO_2$ laden air is directed through the cells of the sorbent structure. It is also contemplated that the sorbent structure can be formed by embedding the sorbent material in the Celcor® cellular, ceramic structure to form a monolithic sorbent structure.

In addition, it should be noted that the substrate, while preferably ceramic, an inorganic material, can be an organic material.

$CO_2$ laden air is passed through the sorbent structure, which is preferably pancake shaped, and the sorbent structure binds the $CO_2$ until the sorbent structure reaches a specified saturation level, or the $CO_2$ level at the exit of the sorbent structure reaches a specified value denoting that $CO_2$ breakthrough has started ($CO_2$ breakthrough means that the sorbent structure is saturated enough with $CO_2$ that a significant amount of additional $CO_2$ is not being captured by the sorbent structure).

When it is desired to remove and collect $CO_2$ from the sorbent structure (and regenerate the sorbent structure), in a manner described further below in connection with FIGS. 10a-h, the sorbent structure is removed from the carbon dioxide laden air stream and isolated from the air stream and from other sources of air ingress. Steam is then passed through the sorbent structure. The steam will initially condense and transfer its latent heat of condensation to the sorbent structure. Eventually the sorbent structure will reach saturation temperature and the steam will pass through the sorbent structure without condensing. As the condensate and then the steam pass through and heat the sorbent structure the $CO_2$ that was captured by the sorbent structure will be liberated from the sorbent structure producing more condensed water in providing the needed heat of reaction to liberate the $CO_2$ from the sorbent structure and be pushed out of the sorbent structure by the steam or extracted by a fan/pump. Thus, the steam that is passed through the sorbent structure and releases the $CO_2$ from the sorbent, and for energy efficiency cost reasons one would want to minimize the amount of steam used and that is mixed in with the $CO_2$. Thus, whatever is (or can be) condensed upon exiting the regeneration chamber and the condensate can be added to that generated in the regeneration chamber, and recycled to be heat and converted back into steam for use. This technique is referred to as "steam stripping" and is also described further below.

Vertical Elevator Concept of FIGS. 10a-10f, and 10h

FIGS. 10a, 10b are schematic illustrations of structure and method concepts that further develop the principles by which carbon dioxide can be removed from $CO_2$ laden air, according to the principles of the present invention. In particular, FIGS. 10a, 10b further develop the principles disclosed in FIG. 6 of U.S. application Ser. No. 12/124,864. FIGS. 10c-h, and Exhibits A and B further show details of the structure and method of FIGS. 10a and 10b.

Specifically, in FIG. 10a, a rectangular carbon dioxide capture structure 1000 is illustrated, which has a sorbent structure, as described herein, that can be brought into contact with $CO_2$ laden air to remove carbon dioxide from the $CO_2$ laden air. The rectangular carbon dioxide capture structure is similar to the pancake shaped substrates of FIG. 6 in the sense that it has relatively large area compared to its thickness, and is oriented vertically in relation to a flow of $CO_2$ laden air. The carbon dioxide capture structure 1000 comprises a top member 1002 that is preferably a solid metal plate, and a sorbent structure 1004 depending from the top member 1002. When located in a stream of $CO_2$ laden air, the sorbent structure 1004 is open to $CO_2$ laden air stream on the large area faces through which the air is directed by the fan or prevailing wind and carries the sorbent that binds to carbon dioxide flowing through the sorbent structure, to capture carbon dioxide from a flow of carbon dioxide laden air that is directed through the sorbent structure. The sorbent structure 1004 provides a high surface area and low pressure drop, as $CO_2$ laden air flows through the sorbent structure 1004.

The carbon dioxide capture structure 1000 is supported for vertical movement by an elevator structure, shown and described in overview in connection with FIGS. 10a and 10b, and whose details are further described and shown in connection with FIGS. 10c-f and 10h. As shown in FIG. 10a, a hydraulic cylinder 1006 is connected with the top member 1002 and is moveable in a structural frame 1008 that protects the hydraulic cylinder from the ambient environment. The hydraulic cylinder 1006 can selectively move the carbon dioxide capture structure 1000 between a carbon dioxide capture position that is in line with a flow of carbon dioxide laden air, and a regeneration position described further below. In the carbon dioxide capture position a flow of carbon dioxide laden air (labeled "fresh air inlet" in FIG. 10a) is drawn through the carbon dioxide capture structure 1000 (e.g. by means of an induced draft created by a fan 1010 driven by a motor 1012). The carbon dioxide laden air flows through the sorbent support structure 1004 where the sorbent binds the carbon dioxide, to remove the carbon dioxide from the air, so that the air that exits the carbon dioxide capture structure 1000 is substantially depleted of carbon dioxide (preferably about 95% depleted of carbon dioxide).

The carbon dioxide capture structure 1000 can be selectively moved to a regeneration position (by the hydraulic cylinder 1006 or by a pulley system that would perform the analogous function of moving the carbon dioxide capture structure between the adsorption and regeneration positions), where carbon dioxide is separated from the sorbent structure 1004, to enable the carbon dioxide to be collected and sequestered, and to enable the sorbent structure to be regenerated, so that the sorbent structure can then be moved back to a position where it is in line with a flow of carbon dioxide laden air, to remove additional carbon dioxide from that air. A regeneration box 1014 is located below the carbon dioxide capture structure 1000. The regeneration box 1014 is preferably solid metal plate on 5 sides, and is open on top, so that when the carbon dioxide capture structure 1000 is lowered into the box 1014, the top plate 1002 will close the top of the regeneration box 1014. The regeneration box 1014 is well insulated for heat conservation purposes and can be selective heated by a flow of process heat (preferably from a co-generation system and process, as described further herein). As the regeneration box 1014 is heated (preferably by the "steam stripping process described herein), the carbon dioxide is separated from the sorbent structure, and is drawn off so that the carbon dioxide can be sequestered. As the carbon dioxide is separated from the sorbent structure, and drawn from the regeneration box 1014, the sorbent structure is regenerated, so that the carbon dioxide capture structure 1000 can be moved to the position in which it is in line with a flow of carbon dioxide laden air, to remove carbon dioxide from the carbon dioxide laden air.

FIG. 10b schematically illustrates an alternative to the structure and technique of FIG. 10a, in that a pair of carbon dioxide capture structures 1000 are provided, each of which is configured in accordance with the carbon dioxide capture structure of FIG. 10a, and each of which is moved by a hydraulic cylinder 1002 between a carbon capture position in which the carbon capture structure is in line with a flow of carbon laden air, and a regeneration position in which the carbon dioxide capture structure is lowered into a regeneration box 1014 that is configured like, and operates in a similar manner to, the regeneration box 1014 of FIG. 10a. The only essential different between the carbon capture structure and technique of FIG. 10b and FIG. 10b, is that in FIG. 10b, one carbon dioxide capture structure can always be in line with a flow of carbon dioxide laden air while the other carbon dioxide capture structure is being regenerated in the manner described above in connection with FIG. 10a. Thus, in FIG. 10b (and in a manner similar to that shown in FIG. 6), when a carbon dioxide capture structure 1000 is in an upper position (e.g. the upper position shown in FIG. 10b), carbon dioxide laden air is directed through a sorbent structure, so that the sorbent structure binds carbon dioxide in the carbon dioxide laden air. When a carbon dioxide capture structure 1000 is moved to the lower position and into the regeneration box 1014, process heat is directed at the substrate, and carbon dioxide is removed (drawn off) the sorbent support structure (again preferably by the "steam stripping" process described herein). The pair of carbon dioxide capture structures 1000 can alternatively move between the upper and lower positions, so that the carbon dioxide capture structure in the upper position is removing carbon dioxide from the carbon dioxide laden air and carbon dioxide is being removed from the sorbent structure that is in the lower position.

While FIGS. 10a and 10b each shows a single sorbent structure for removing carbon dioxide from carbon dioxide laden air and for regenerating a carbon dioxide sorbent structure (such sorbent structure sometimes referred to herein as a Unit, in practice a global thermostat system would have a number of Units, each of which is configured and operates in accordance with the structures and techniques described above, as will be clear to those in the art. Moreover, FIG. 10h shows and describes the elevator structure in additional detail, and as shown in FIGS. 10c, d, e and f, the elevator structure can comprise, e.g., pairs of hydraulic cylinders that are located such that they do not interfere with the flow of carbon dioxide laden air through the sorbent structure.

Exhibits A and B are enlarged, color images of FIGS. 10a, 10b, with narratives that further describe the structure and operation of the embodiments of FIGS. 10a, 10b.

Moreover, the following additional features of the structures and techniques of FIGS. 10a and 10b and Exhibits A and B should also be noted.

a. Piping, valves, etc. for the Low Level Process Heat Source/Supply Header (typically Low Pressure Steam), which will most likely be a horizontal pipe rack run located underneath the horizontal row of identical Global Thermostat (GT) Units, running parallel with the "Dimension W" shown in FIGS. 10a, 10b and Exhibits A and B. If the number of Global Thermostat (GT) Units is also expanded vertically upward, by building a structure with additional platform levels at the appropriate elevations, there will also be a vertical header, or vertical pipe rack run, located at the very end of the horizontal row of identical GT Units, adjacent to the structure containing the additional platform levels at the appropriate elevations.

b. Piping, valves, etc. for the Low Level Process Heat Return Header (typically Low Pressure Steam Condensate), which will most likely be a horizontal pipe rack run located underneath the horizontal row of identical Global Thermostat (GT) Units, running parallel with the "Dimension W" shown in FIGS. 10a, 10b and Exhibits A and B. If the number of Global Thermostat (GT) Units is also expanded vertically upward, by building a structure with additional platform levels at the appropriate elevations, there will also be a vertical header, or vertical pipe rack run, located at the very end of the horizontal row of identical GT Units, adjacent to the structure containing the additional platform levels at the appropriate elevations.

c. Piping, valves, etc. for the optional Cooling Water Supply (CWS) Header, which will most likely be a horizontal pipe rack run located underneath the horizontal row of identical Global Thermostat (GT) Units, running parallel with the "Dimension W" shown in FIGS. 10a, 10b and Exhibits A and B. If the number of Global Thermostat (GT) Units is also expanded vertically upward, by building a structure with additional platform levels at the appropriate elevations, there will also be a vertical header, or vertical pipe rack run, located at the very end of the horizontal row of identical GT Units, adjacent to the structure containing the additional platform levels at the appropriate elevations.

d. Piping, valves, etc. for the optional Cooling Water Return (CWR) Header, which will most likely be a horizontal pipe rack run located underneath the horizontal row of identical Global Thermostat (GT) Units, running parallel with the "Dimension W" shown in FIGS. 10a, 10b and Exhibits A and B. If the number of Global Thermostat (GT) Units is also expanded vertically upward, by building a structure with additional platform levels at the appropriate elevations, there will also be a vertical header, or vertical pipe rack run, located at the very end of the horizontal row of identical GT Units, adjacent to the structure containing the additional platform levels at the appropriate elevations.

e. Piping, valves, etc. for the $CO_2$ (>95.00 mole %) to $CO_2$ Product Storage Header, which will most likely be a horizontal pipe rack run located underneath the horizontal row of identical Global Thermostat (GT) Units, running parallel with the "Dimension W" shown in FIGS. 10a, 10b. If the number of Global Thermostat (GT) Units is also expanded vertically upward, by building a structure with additional platform levels at the appropriate elevations, there will also be a vertical header, or vertical pipe rack run, located at the very end of the horizontal row of identical GT Units, adjacent to the structure containing the additional platform levels at the appropriate elevations.

f. The CO2 Receiving/Storage Vessel, and any and all equipment required to connect to, or tie-in to, a high pressure $CO_2$ disposal pipeline.

g. Supply and Return tie-ins (piping, valves, etc.) to the Low Level Process Heat Source at the existing industrial facility (Power Plant, Chemical Plant, or Refinery, etc.), which would most likely be ordinary low pressure steam supply/low pressure steam condensate return.

h. Supply and Return tie-ins (piping, valves, etc.) to the Low Level Cooling Source at the existing industrial facility (Power Plant, Chemical Plant, or Refinery, etc.), which would most likely be ordinary or common cooling water supply (CWS)/cooling water return (CWR).

i. All instrumentation, all electrical facilities (such as substations, wiring, etc.), all general utility connections (such as instrument air, potable water, etc.), all safety and shutdown systems, etc. This would also include a Control House, with a typical Computer Data Logger/Computer Control System.

j. All of the block valves shown in FIGS. 10a, 10b and Exhibits A and B will be specified to be either "minimal leakage" or TSO (tight shut-off) block valves, whichever is most practical or most feasible.

k. All of the block valves shown FIGS. 10a, 10b and Exhibits A and B will be fully automated block valves (either motorized, hydraulically, or pneumatically operated). All of these block valves will be interlocked together by a timer/sequencer system that is computer controlled. The Hydraulic Fluid Pump(s) and the $CO_2$ Product/Recycle Gas Blower(s) will also be connected to, and interlocked by, the timer/sequencer system that is computer controlled.

l. While the preferred sorbent structure described herein comprises a sorbent material (i.e. an amine) that is carried by (e.g. coated or otherwise immobilized on) the inside of Celcor® cellular substrate, it is contemplated that the sorbent structure can also be formed by embedding the sorbent material in the Celcor® cellular structure to form a monolithic sorbent structure.

m. It is recognized that it may be important to remove oxygen from the environment about the sorbent structure, both before and after regeneration of the sorbent structure, to avoid oxygen contamination of the sorbent structure (which would result from oxygen poisoning the sorbent structure by oxidizing the sorbent structure). The manner in which removal of oxygen can be handled is described below in connection with a technique referred to as "steam stripping with purge gas".

Steam Stripping

There are 2 techniques that are contemplated for the steam stripping process. One technique is referred to as "steam stripping with steam only". The other technique is referred to as "steam stripping with purge gas". Both techniques utilize system components and process steps that are schematically shown in FIG. 10g.

The technique referred to as "steam stripping with steam only" works in the following way:

a. Air is passed through the channels in the sorbent structure and the $CO_2$ is removed from the air by the sorbent structure until the sorbent structure reaches a specified saturation level or the $CO_2$ level at the exit of the sorbent structure reaches a specified value denoting that $CO_2$ breakthrough has started, or for a specified time period determined by testing.

b. The sorbent structure is removed from the air stream and isolated from the air flow and from air ingress and $CO_2$ migration to the outside air.

c. Low pressure steam is passed through the channels in the sorbent structure. The steam will initially condense and transfer its latent heat of condensation to the sorbent structure in the front part of the sorbent structure. The heat of condensation raises the temperature of the sorbent structure and provides energy to drive the $CO_2$ desorption process from the sorbent structure. Eventually the front part of the sorbent structure will reach saturation temperature and the liberated $CO_2$ will be pushed out by the steam or extracted by a fan. This process will move deeper into the sorbent structure from the front part of the sorbent structure where the steam enters until the $CO_2$ is liberated (note the fraction released will depend upon the sorbent structure and temperature steam used). Only an adequate amount of steam will be provided to achieve desorption of the $CO_2$ from the sorbent structure so as to minimize the steam used and minimize the amount of steam mixed in with the liberated $CO_2$). As the condensate and then the steam pass through the sorbent structure and heat the sorbent the $CO_2$ will be liberated from the sorbent structure and be transferred into the steam and condensate. The condensate will have a limited ability to "hold" the $CO_2$ and once saturated the "sour" water will not hold any more $CO_2$ and the $CO_2$ will remain in the vapor phase as it is pushed out by the steam or extracted with a fan. Once the steam has passed through the sorbent structure it has to be condensed to liberate the $CO_2$. This is achieved in the condenser which uses cooling water to remove the heat. The collected stream will have some steam mixed in that will be minimized to the extent possible, and that steam has to be condensed to separate it from the $CO_2$. Alternatively the steam could be condensed, using heat loss to the atmosphere, in an uninsulated pipe or a finned pipe. This heat is a loss to the system although an alternative would be to use the air exiting the sorbent structure in the adsorption step (Step 1 above) to condense the steam. This would raise the temperature of the air at the exit of the sorbent structure and provide an additional driving force to move the air through the sorbent structure and reduce the energy requirements.

d. Once the sorbent structure has had the $CO_2$ removed then the sorbent structure is raised up back into the air stream. The air will cool the sorbent structure and remove any remaining moisture. The sorbent structure will then remove the $CO_2$ until the specified breakthrough occurs (see Step 1) and the sorbent structure is then lowered into the regeneration position and the process repeated.

e. The condensate from the desorption process (removing the $CO_2$ from the sorbent structure) contains $CO_2$ at saturation levels. This condensate will be close to saturation temperature (as only sufficient steam is added to the system to achieve $CO_2$ removal) and is recycled to a boiler where low pressure steam from a facility (petrochemical plant or utility power plant) is used to regenerate the steam used for heating the sorbent structure. The re-use of the $CO_2$ saturated steam eliminates the requirement to treat large quantities of acidic water.

The technique referred to as "steam stripping with purge gas" works in the following way:

a. Air is passed through the channels in the sorbent structure and the $CO_2$ is removed from the air by the sorbent structure until the sorbent structure reaches a specified saturation level or the $CO_2$ level at the exit of the sorbent structure reaches a specified value denoting that $CO_2$ breakthrough has started, or for a specified time period determined by testing.

b. The sorbent structure is removed from the air stream and isolated from the air flow and from air ingress and $CO_2$ migration to the outside air.

c. In order to remove oxygen from the channels in the sorbent structure a purge of inert gas is passed through the sorbent structure for a short time period.

d. Low pressure steam is passed through the channels in the sorbent structure. The steam will initially condense and transfer its latent heat of condensation to the sorbent structure in the front part of the sorbent structure. The heat of condensation raises the temperature of the sorbent structure and provides energy to drive the $CO_2$ desorption process from the sorbent structure. Eventually the front part of the sorbent structure will reach saturation temperature and the liberated $CO_2$ will be pushed out by the steam or extracted by a fan. This process will move deeper into the sorbent structure from the front part of the sorbent structure where the steam enters until the $CO_2$ is liberated (note the fraction released will depend upon the sorbent structure and temperature steam used). Only an adequate amount of steam will be provided to achieve desorption of the $CO_2$ from the sorbent structure so as to minimize the steam used and minimize the amount of steam mixed in with the liberated $CO_2$). As the condensate and then the steam pass through the sorbent structure and heat the sorbent the $CO_2$ will be liberated from the sorbent structure and be transferred into the steam and condensate. The condensate will have a limited ability to "hold" the $CO_2$ and once saturated the "sour" water will not hold any more $CO_2$ and the $CO_2$ will remain in the vapor phase as it is pushed out by the steam or extracted with a fan. Once the steam has passed through the sorbent structure it has to be condensed to liberate the $CO_2$. This is achieved in the condenser which uses cooling water to remove the heat. The collected stream will have some steam mixed in that will be minimized to the extent possible, and that steam has to be condensed to separate it from the $CO_2$. Alternatively the steam could be condensed, using heat loss to the atmosphere, in an uninsulated pipe or a finned pipe. This heat is a loss to the system although an alternative would be to use the air exiting the sorbent structure in the adsorption step (Step 1 above) to condense the steam. This would raise the temperature of the air at the exit of the sorbent structure and provide an additional driving force to move the air through the sorbent structure and reduce the energy requirements.

e. In order to cool the sorbent structure before it is replaced in the air stream an inert gas is passed through the sorbent structure until it is cooled to a specified temperature so that damage to the sorbent structure will not occur when it is placed back into the air stream.

f. Once the sorbent has had the $CO_2$ removed and the sorbent structure cooled then the sorbent structure is raised up back into the air stream. The air will continue to cool the sorbent structure and remove any remaining moisture. The sorbent structure will then remove the $CO_2$ until the specified breakthrough occurs (see Step 1) and the sorbent structure is then lowered into the regeneration position and the process repeated.

g. The condensate from the desorption process (removing the $CO_2$ from the sorbent structure) contains $CO_2$ at saturation levels. This condensate will be close to saturation temperature (as only sufficient steam is added to the system to achieve $CO_2$ removal) and is recycled to a boiler where low pressure steam from a facility (petrochemical plant or utility power plant) is used to regenerate the steam used for heating the sorbent structure. The re-use of the $CO_2$ saturated steam eliminates the requirement to treat large quantities of acidic water.

It should be noted that in each of the steam stripping techniques described above, there are two closed steam loops connected by a heat exchanger. One steam loop supplies the process heat and returns to the boiler hot condensate that results from heating the loop that does the steam stripping. The other steam loop is the steam loop that does the steam stripping and regeneration of the sorbent structure.

Steam stripping, as described above, would be performed in the foregoing manner while the sorbent structure is disposed in the regeneration box 1014 shown and described in connection with FIGS. 10*a*, 10*b*. Once the sorbent structure has had the $CO_2$ removed then the sorbent structure is raised from the regeneration box 1014 back into the carbon dioxide laden air stream, as also shown and described in connection with FIGS. 10*a*, 10*b*. The carbon dioxide laden air stream will cool the sorbent structure and remove any remaining moisture. The sorbent structure will then remove the $CO_2$ until the specified breakthrough occurs and the sorbent structure is then lowered into the regeneration position in regeneration box 1014.

Sorbent Characteristics

In general, the sorbent that forms the sorbent structure is characterized by its ability to adsorb (bind $CO_2$) at low temperature and concentration and regenerate at high temperature and high concentration (because $CO_2$ that is captured by the sorbent structure would have a high $CO_2$ concentration). Since the concentration of $CO_2$ in $CO_2$ laden air is on the order of 300 times smaller than the concentration of $CO_2$ in flue gases (a major contributor to the presence of $CO_2$ in the atmosphere), the $CO_2$ is captured from a stream of $CO_2$ laden air at ambient temperature (e.g. about 20 degrees C. in many climates) and the temperature of the steam used in the steam stripping process described above is at a temperature of about 100-120 degrees C., based on the Langmuir isotherm or Langmuir adsorption equation (which is known to those in the art), the sorbent coverage of the sorbent structure should not be too high at the lower temperature at which the $CO_2$ is captured, because that will increase the temperature required to remove the $CO_2$ from the sorbent structure. Thus, while the sorbent material is preferably an amine, the specific amine material or other suitable sorbent may vary for different climates to optimize the net $CO_2$ that is collected during each cycle of capture and regeneration in which the system and process of the present invention will be used.

Co-Generation and Process Heat

As explained above, according to the present invention, process heat is used to provide the steam that is used in the "steam stripping" process and system described herein, to remove $CO_2$ from the sorbent structure and regenerate the sorbent structure. It is also preferred that the process heat is provided by a co-generation process and system, where a primary process (e.g. a petrochemical plant, a utility facility, etc.) produces steam that is provided directly to the system of the present invention and used to remove the $CO_2$ from the sorbent structure and regenerate the sorbent structure.

Industrial plants such as power stations and petrochemical plants generate large amounts of steam. The higher the pressure at which the steam is generated the higher the thermal efficiency that can be achieved and the use of co-generation systems (where gas turbines generate electricity and the hot gases from the turbine are used to generate more steam) also improves the overall thermal efficiency of a $CO_2$ capture system and process, according to the principles of the present invention.

There are many different designs of steam systems within the petrochemical industry due to the different mix of electric and turbine drivers for pumps and compressors, the temperature required for column reboilers and preheating duties, etc. These affect both the amount of steam generated and also the number of pressure levels at which the steam is supplied to the process. Given these qualifications a "typical" petrochemical steam system design includes steam that is generated at very high pressure (VHP) by the large boilers and co-generation facilities. This VHP steam is passed to turbines which are used to drive motors or compressors and result in exhaust steam at lower pressures. The next levels of steam are HP and MP which are provided from the extraction turbines or by direct let-down from the VHP steam main. The final steam level is LP and is provided by the exit steam from the turbines and by direct let-down. Each steam level provides steam to different users and any excess steam is passed down to the next steam level. Thus the LP steam receives all the steam that cannot be used usefully at the higher steam levels. It is important to recognize that in a petrochemical facility the steam system must be flexible as different sections of the process may be off-line or starting-up, shutting down or be at lower than design rates at different times. This is different from a utility power plant where the steam only has to provide one function—generating electricity.

The value of steam depends upon the pressure level. The base cost of the VHP steam is fixed by the capital and operating costs of generation. However, as the steam is reduced in pressure by passing through the turbines energy is generated and this reduces the cost of the steam.

In the case of the proposed use of LP steam to release the $CO_2$ from the sorbent structure the following advantages appear to exist for a typical large petrochemical facility:

a. At a proposed steam level for the present invention (2-10 psig) the cost of the required steam will be very low for a typical facility, although this will vary between facilities depending upon the amount of LP that is available b. In comparison with a conventional amine system that requires steam at approximately 60 psig the cost of steam at this level will be significantly higher than for the 2-10 psig steam. In addition it is much more likely that there will not be an adequate supply of 60 psig available and that additional VHP steam would have to be generated. This would raise the cost of the 60 psig steam as it would either have to be charged at the full cost of VHP steam or additional turbines would have to be installed to recover power, but this would involve significant capital costs.

In most power plants a steam supply is extracted from the low pressure turbine to heat the feed water to the system. This extraction steam would be suitable for use in the proposed process to remove $CO_2$ from the sorbent structure as it is in co-generation of electricity and industrial heat. In the cogeneration of electricity and $CO_2$ described in this embodiment it is possible to use very low pressure (2 lb above atmosphere pressure and temperature around 105 C) and can return the condensate to heat the boiler since the process heat being used is only the latent heat of the steam. While cogeneration of electricity and industrial heat reduces the electricity produced it does raise the overall thermal efficiency of using the heat generated to useful energy from 35-40% to 85-95%. It is thus favored when there are nearby uses for the low temperature and pressure steam (usually 120 deg C., 2 lbs above atmosphere steam). In the cogeneration of electricity and $CO_2$ capture one can site the facility close enough to use the low temperature and pressure steam and by being able to use even lower pressure and temperature steam and recirculating the hot condensate in the process heat steam loop back to heat the boiler minimize the impact on electricity generation and thus the cost of the steam.

Sorbant Coated Pellet Structure and Concept of FIGS. 11a, 11b

FIGS. 11a, and 11b show 2 examples of another structure and technique for removing carbon dioxide from a flow of carbon dioxide laden air, and regenerate a sorbent used to absorb or bind to the carbon dioxide, in accordance with the principles of the present invention.

In the structures and techniques of FIGS. 11a and 11b, particles, preferably of pellet size, flow by gravity into a pellet feed source/storage bin 1100. The pellets are coated with the sorbent (e.g. an amine) that absorbs or binds carbon dioxide in a flow of carbon dioxide laden air that flows through the pellets. The pellets can be selectively fed through a valve structure 1102 into an air contacting vessel 1104, and a flow of carbon dioxide laden air is directed through the vessel 1104, so that the sorbent absorbs or binds the carbon dioxide and removes the carbon dioxide from the air. A regeneration bin 1106 is provided below the air contacting vessel 1104. The pellets can be selectively directed into the regeneration bin 1106, where process heat is directed at the pellets, to remove carbon dioxide from the sorbent and regenerate the sorbent. The pellets with the regenerated sorbent are then directed to a vertical lifting structure 1108, where they are redirected to a location that enables them to flow into the feed source/storage bin 1100 continue the carbon dioxide removal process. The vertical lifting structure 1108 can comprise, e.g. an air blown structure, an elevator, a screw conveyer, etc, that directs the pellets back to the location that enables them to restart the carbon dioxide removal process. The difference between the systems and techniques of FIGS. 11a and 11b is that in the system and technique of FIG. 11a, the carbon dioxide laden air flows downward through a mass of pellets contained in the air contacting vessel 1104, whereas in the system and technique of FIG. 11b, the carbon dioxide laden air flows horizontally through the pellets are then are flowing into the air contacting vessel 1104.

The structure and techniques of FIGS. 11a, 11b are useful in removing carbon dioxide from carbon dioxide laden air, and may also be useful in removing carbon dioxide from flue gases that emanate from a source that would otherwise direct carbon dioxide into the atmosphere. Specifically, the structure and techniques of FIGS. 11a and 11b can be used to provide sorbent coated pellets directly in the path of flue gases that emanate from a source and would otherwise be directed into the atmosphere. The sorbent coated pellets can be used to remove carbon dioxide from the flue gases, and the sorbent can then be treated with process heat, to remove the carbon dioxide from the pellets (so that it can be drawn off and sequestered), and to regenerate the sorbent on the pellets (so that it can continued to be used to remove carbon dioxide from the flue gases).

Exhibits C and D are enlarged, color images of FIGS. 11a, 11b, with narratives that further describe the structure and operation of the embodiments of FIGS. 11a, 11b.

It should also be noted that while the structures of FIGS. 11a, 11b are vertically oriented, it may be desirable that certain structures (e.g. the particle beds) be tilted (to facilitate water that condenses from steam during regeneration to drop to the bottom of the particle bed and not block the particle beds), or even oriented horizontally (also to deal with the condensed water issue).

Additional Comment Regarding Combining Air Stream with Flue Gas

The principles of the present invention can be applied in a new and useful way to remove $CO_2$ from a combination of $CO_2$ laden air and flue gases (e.g. from a fossil fuel plant). A relatively large volume ratio (e.g. 98-99%) of $CO_2$ laden air is with a relatively small volume of flue gases (which contain a relatively high concentration of $CO_2$ that will ultimately have to be removed from the $CO_2$ laden air) to produce a fluid stream in which the $CO_2$ in the flue gases adds sufficient $CO_2$ to the air to make the cost of removal of $CO_2$ more advantageous, and also provides benefits in that the $CO_2$ laden air cools the flue gases. Application of the principles of the invention to produce such a fluid stream is believed to make the principles of the invention described above particularly efficient. The $CO_2$ in the relatively large volume of $CO_2$ laden air is still relatively low concentration, in accordance with a basic concept of applicants' paradigm, and the small volume amount of flue gases increase the concentration of $CO_2$ in the fluid stream, and makes the applicant's process even more cost efficient in the manner in which it removes $CO_2$ from an ambient fluid stream. At the same time, the ambient air cools the flue gases, in a manner that enables the process to function with an amine as the sorbent, which is believed to be efficient because the process can remove $CO_2$ from the sorbent, and regenerate at low temperature range, and the amine can be efficiently regenerated.

In Summary

Accordingly, with the structure and technique of FIGS. 10a-10h, carbon dioxide laden air is directed through the vertically oriented carbon dioxide capture structure 1000 that has sorbent that absorbs or binds carbon dioxide, to remove carbon dioxide from the air, the vertically oriented carbon dioxide capture structure is lowered into a regeneration enclosure 1014, where process heat is directed at the carbon dioxide capture structure, to separate carbon dioxide from the sorbent, and regenerate the sorbent, and the carbon dioxide capture structure 1000 is selectively raised out of the regeneration enclosure and to a position that is in the flow of carbon dioxide laden air, so that the regenerated sorbent can continue to be used to absorb or bind carbon dioxide, to remove carbon dioxide from the flow of carbon dioxide laden air. Moreover, With the structure and technique of FIGS. 11a, 11b, a flow of sorbent carrying particles is selectively fed into a carbon dioxide removal chamber 1104, a fluid is directed through particles in the carbon dioxide removal chamber, so that carbon dioxide is absorbed or bound by the sorbent, to remove the carbon dioxide from the fluid, the particles are directed to a carbon separation/regeneration chamber 1106, where process heat is used to separate carbon dioxide from the sorbent, and regenerate the sorbent carried by the particles, and the particles with the regenerated sorbent are directed back to a particle feed source, so that the particles with the regenerated sorbent can be reused to absorb or bind carbon dioxide in the fluid.

Still further, the principles of the present invention can be provided in method of capturing $CO_2$, wherein a flow of $CO_2$ laden air is provided, a small amount (by volume) of flue gas is added to the flow of $CO_2$ laden air, to produce a fluid flow in which the concentration of $CO_2$ is significantly increased, in comparison to the $CO_2$ concentration in the flow of $CO_2$ laden air, and the fluid flow is passed through a sorbent structure that binds $CO_2$ in the fluid flow.

Thus, the principles of the present invention are used to further develop the principles described in U.S. application Ser. No. 12/124,864 (particularly the embodiment of FIG. 6 of that application), and to disclose further concepts for removing carbon dioxide from a fluid, in accordance with the general principles of U.S. application Ser. No. 12/124,864. With the foregoing disclosure in mind, it is believed that various other ways of removing carbon dioxide from a fluid, in accordance with the principles of this application, will become apparent to those in the art.

What is claimed is:

1. A method of removing carbon dioxide from carbon dioxide-laden ambient air, comprising directing a flow of carbon dioxide-laden air through a vertically oriented, monolithic carbon dioxide capture structure that is supporting an amine sorbent that binds carbon dioxide, to remove carbon dioxide from the air by binding carbon dioxide to the sorbent, moving the vertically oriented, monolithic carbon dioxide capture structure into a regeneration enclosure, and directing saturated steam at a temperature of not greater than about 120° C., carrying process heat, at the carbon dioxide capture structure in the regeneration enclosure to separate the carbon dioxide from the sorbent, and regenerate the sorbent, withdrawing the carbon dioxide from the regeneration enclosure together with any remaining steam, and selectively moving the vertically oriented carbon dioxide capture structure out of the regeneration enclosure and back to a position that is in the flow of carbon dioxide-laden ambient air, so that the regenerated sorbent can continue to be used to bind carbon dioxide, to remove carbon dioxide from the flow of carbon dioxide-laden air.

2. The method of claim 1, wherein the vertically oriented carbon dioxide capture structure comprises a top support member, and a sorbent support structure depending from the top support member, and wherein the regeneration enclosure is substantially enclosed except for a top opening that is closed by the top support structure when the carbon dioxide capture structure is moved into the regeneration enclosure, rendering the regeneration enclosure substantially air-tight.

3. The method of claim 2, wherein a pair of vertically oriented carbon dioxide capture structures are provided, each of which is selectively configured and operable in the manner described in claim 2, and wherein one of the pair of vertically oriented carbon capture structures is in the path of carbon dioxide-laden ambient air while the other of the pair of vertically oriented carbon capture structures is being heated with process heat steam to separate the carbon dioxide from the sorbent and regenerate the sorbent, in the manner described in claim 2.

4. The method of claim 1, wherein a pair of vertically oriented carbon dioxide capture structures are provided, each of which is selectively configured and operable in the manner described in claim 1, and wherein one of the pair of vertically oriented carbon capture structures is in the path of carbon dioxide-laden ambient air while the other of the pair of vertically oriented carbon capture structures is being heated with process heat steam to separate the carbon dioxide from the sorbent and regenerate the sorbent, in the manner described in claim 1.

5. The method of capturing $CO_2$ in accordance with claim 1, further comprising
a) providing a flow of $CO_2$-laden ambient air,
b) adding a small amount (by volume) of flue gas to the flow of $CO_2$-laden ambient air, to produce a combined fluid flow in which the concentration of $CO_2$ is significantly increased, in comparison to the $CO_2$ concentration in the flow of $CO_2$-laden ambient air, and
c) passing the combined fluid flow through the vertically oriented carbon dioxide capture structure that binds $CO_2$ from the combined fluid flow.

6. The method of claim 1, wherein the process heat that is directed at the carbon dioxide capture structure is provided by a co-generation process wherein process heat steam provided from a primary process is directed at the carbon dioxide capture structure.

7. The method of claim 1, wherein the steam is directed at the carbon dioxide capture structure in a manner such that the steam releases captured carbon dioxide from the carbon dioxide capture structure and transports the released carbon dioxide to a predetermined location.

8. The method of claim 7 wherein the transported steam and released carbon dioxide is cooled and condensed and separated from the remaining carbon dioxide gas.

* * * * *